United States Patent
Rosner et al.

(10) Patent No.: US 11,537,389 B2
(45) Date of Patent: *Dec. 27, 2022

(54) MEMORY DEVICES, SYSTEMS, AND METHODS FOR UPDATING FIRMWARE WITH SINGLE MEMORY DEVICE

(71) Applicant: Infineon Technolgies LLC, San Jose, CA (US)

(72) Inventors: Stephan Rosner, Campbell, CA (US); Sergey Ostrikov, Redwood City, CA (US); Clifford Zitlaw, San Jose, CA (US); Yuichi Ise, Kanagawa (JP)

(73) Assignee: Infineon Technologies LLC, San Jose, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 17/068,492

(22) Filed: Oct. 12, 2020

(65) Prior Publication Data

US 2021/0026620 A1 Jan. 28, 2021

Related U.S. Application Data

(63) Continuation-in-part of application No. 16/735,177, filed on Jan. 6, 2020, now Pat. No. 11,061,663, which
(Continued)

(51) Int. Cl.
*G06F 12/10* (2016.01)
*G06F 21/57* (2013.01)
(Continued)

(52) U.S. Cl.
CPC ............. *G06F 8/654* (2018.02); *G06F 12/10* (2013.01); *G06F 8/60* (2013.01); *G06F 8/65* (2013.01);
(Continued)

(58) Field of Classification Search
CPC ... G06F 8/654; G06F 8/60; G06F 8/65; G06F 8/71; G06F 8/66; G06F 12/10;
(Continued)

(56) References Cited

U.S. PATENT DOCUMENTS

| | | | | |
|---|---|---|---|---|
| 5,210,854 A | * | 5/1993 | Beaverton | ........... G06F 9/44521 717/174 |
| 5,426,769 A | | 6/1995 | Pawloski | |

(Continued)

FOREIGN PATENT DOCUMENTS

| | | |
|---|---|---|
| JP | 2009265877 A | 11/2009 |
| JP | 2013161117 A | 8/2013 |
| KR | 20120038901 A | 4/2012 |

OTHER PUBLICATIONS

Andrea Marongiu et al., Fast and Lightweight Support for Nested Parallelism on Cluster-Based Embedded Many-Cores, 2012 IEEE, [Retrieved on Aug. 24, 2022], Retrieved from the internet: <URL: https://ieeexplore.ieee.org/stamp/stamp.jsp?tp=&arnumber=6176441 >6 Pages (1-6) (Year: 2012).*

(Continued)

*Primary Examiner* — Anibal Rivera

(57) ABSTRACT

A method can include storing first instruction data in a first region of a nonvolatile memory device; mapping addresses of the first region to predetermined memory address spaces of a processor device; executing the first instruction data from the first region with the processor device; receiving second instruction data for the processor device. While the first instruction data remains available to the processor device, the second instruction data can be written into a second region of the nonvolatile memory device. By operation of the processor device, addresses of the second region can be remapped to the predetermined memory address spaces of the processor device; and executing the second
(Continued)

instruction data from the second region with the processor device.

20 Claims, 16 Drawing Sheets

Related U.S. Application Data is a continuation of application No. 16/005,262, filed on Jun. 11, 2018, now Pat. No. 10,552,145.

(60) Provisional application No. 62/597,709, filed on Dec. 12, 2017.

(51) Int. Cl.
| | |
|---|---|
| *G06F 9/24* | (2006.01) |
| *G06F 8/654* | (2018.01) |
| *G06F 11/10* | (2006.01) |
| *G06F 8/71* | (2018.01) |
| *G06F 8/60* | (2018.01) |
| *G06F 12/02* | (2006.01) |
| *G06F 8/65* | (2018.01) |
| *G06F 9/50* | (2006.01) |
| *G06F 12/14* | (2006.01) |
| *G06F 9/32* | (2018.01) |
| *G06F 9/445* | (2018.01) |
| *G06F 9/4401* | (2018.01) |
| *G06F 9/26* | (2006.01) |

(52) U.S. Cl.
CPC ............... *G06F 8/71* (2013.01); *G06F 9/268* (2013.01); *G06F 9/328* (2013.01); *G06F 9/4401* (2013.01); *G06F 9/4403* (2013.01); *G06F 9/44521* (2013.01); *G06F 9/5061* (2013.01); *G06F 11/1068* (2013.01); *G06F 12/0246* (2013.01); *G06F 12/0284* (2013.01); *G06F 12/1433* (2013.01); *G06F 2212/1008* (2013.01); *G06F 2212/1052* (2013.01); *G06F 2212/657* (2013.01)

(58) Field of Classification Search
CPC .. G06F 12/0246; G06F 12/0284; G06F 12/06; G06F 12/1433; G06F 2212/1008; G06F 2212/657; G06F 9/4401; G06F 9/328; G06F 9/44521; G06F 9/44; G06F 9/268; G06F 9/4403; G06F 9/441; G06F 11/1068; G06F 12/0638; G06F 12/0868; G06F 21/575; G06F 21/78; G06F 2212/7201; G06F 2212/1052; G06F 9/4406; G06F 9/445; G06F 9/5061
See application file for complete search history.

(56) References Cited

U.S. PATENT DOCUMENTS

| | | | | |
|---|---|---|---|---|
| 5,432,927 | A * | 7/1995 | Grote | G06F 9/4403 711/103 |
| 5,477,176 | A | 12/1995 | Chang et al. | |
| 5,579,522 | A * | 11/1996 | Christeson | G06F 8/65 713/2 |
| 5,596,738 | A | 1/1997 | Pope | |
| 6,000,006 | A | 12/1999 | Bruce et al. | |
| 6,640,334 | B1 * | 10/2003 | Rasmussen | G06F 8/65 717/169 |
| 7,080,245 | B2 * | 7/2006 | Ballard | G06F 9/4401 709/222 |
| 7,698,698 | B2 | 4/2010 | Skan | |
| 7,856,614 | B2 * | 12/2010 | Lu | G06F 8/65 716/117 |
| 7,904,895 | B1 | 3/2011 | Cassapakis et al. | |
| 8,296,467 | B2 * | 10/2012 | Lee | G06F 9/4401 710/5 |
| 8,320,302 | B2 | 11/2012 | Richeson et al. | |
| 8,539,471 | B2 | 9/2013 | Morton | |
| 8,560,823 | B1 | 10/2013 | Aytek et al. | |
| 8,869,138 | B2 | 10/2014 | Bandakka et al. | |
| 9,183,393 | B2 | 11/2015 | Djabarov et al. | |
| 9,274,789 | B2 | 3/2016 | Yuan et al. | |
| 9,459,857 | B2 | 10/2016 | Gerhart et al. | |
| 9,817,652 | B2 | 11/2017 | Choi et al. | |
| 10,282,251 | B2 | 5/2019 | Gusev et al. | |
| 2005/0160217 | A1 | 7/2005 | Gonzalez et al. | |
| 2007/0061581 | A1 | 3/2007 | Holtzman et al. | |
| 2007/0073937 | A1 | 3/2007 | Feinberg et al. | |
| 2007/0255889 | A1 | 11/2007 | Yogev et al. | |
| 2008/0065816 | A1 | 3/2008 | Seo | |
| 2008/0109903 | A1 * | 5/2008 | Werner | G06F 12/1458 711/E12.1 |
| 2009/0320012 | A1 | 12/2009 | Lee et al. | |
| 2011/0208975 | A1 | 8/2011 | Sibert | |
| 2012/0030665 | A1 | 2/2012 | McCarthy et al. | |
| 2012/0284453 | A1 | 11/2012 | Hashimoto | |
| 2013/0024696 | A1 * | 1/2013 | Rudelic | H04L 9/3247 713/176 |
| 2015/0242201 | A1 | 8/2015 | Kim et al. | |
| 2015/0248244 | A1 | 9/2015 | Seo et al. | |
| 2016/0124740 | A1 | 5/2016 | Choi et al. | |
| 2016/0210132 | A1 | 7/2016 | Gerhart et al. | |
| 2017/0168725 | A1 | 6/2017 | Tamura et al. | |
| 2017/0180137 | A1 | 6/2017 | Spanier et al. | |
| 2017/0220404 | A1 | 8/2017 | Seminario | |
| 2017/0235561 | A1 | 8/2017 | Butler et al. | |
| 2017/0249155 | A1 | 8/2017 | Sundrani et al. | |
| 2017/0264481 | A1 | 9/2017 | Chanda et al. | |
| 2018/0067800 | A1 | 3/2018 | Gusev et al. | |
| 2018/0121106 | A1 | 5/2018 | Kim | |
| 2018/0217888 | A1 | 8/2018 | Colgrove et al. | |
| 2019/0179625 | A1 | 6/2019 | Rosner et al. | |
| 2021/0173584 | A1 * | 6/2021 | Chen | G06F 12/0638 |

OTHER PUBLICATIONS

Kenneth Prager et al., A Fault Tolerant Signal Processing Computer, 2000 IEEE, [Retrieved on Aug. 24, 2022], Retrieved from the internet: <URL: https://ieeexplore.ieee.org/stamp/stamp.jsp?tp=&arnumber=857532> 6 Pages (1-6) (Year: 2000).*
Dongzhe Ma et al., A survey of address translation technologies for flash memories, Jan. 2014, 39 pages.
Gangyu Sun et al., Memory that never forgets: emerging nonvolatile memory and the implication for architecture design, Aug. 25, 2017, 16 pages.
International Search Report for International Application No. PCT/US2018/061742 dated Mar. 8, 2019; 4 pages.
Maclain Lobdell, Robust over-the-air firmware updates using program flash memory swap on kinetis microcontrollers, Freescale Semiconductor, Jun. 2012; 20 pages.
USPTO Final Rejection for U.S. Appl. No. 16/005,262 dated Jul. 23, 2019, 37 pages.
USPTO Non Final Rejection for U.S. Appl. No. 16/735,177 dated Oct. 15, 2020; 47 pages.
USPTO Non-Final Rejection for U.S. Appl. No. 16/005,262 dated May 24, 2019, 34 pages.
USPTO Notice of Allowance for U.S. Appl. No. 16/005,262 dated Oct. 16, 2019, 11 pages.
Written Opinion for International Application No. PCT/US2018/061742 dated Mar. 8, 2019; 6 pages.

* cited by examiner

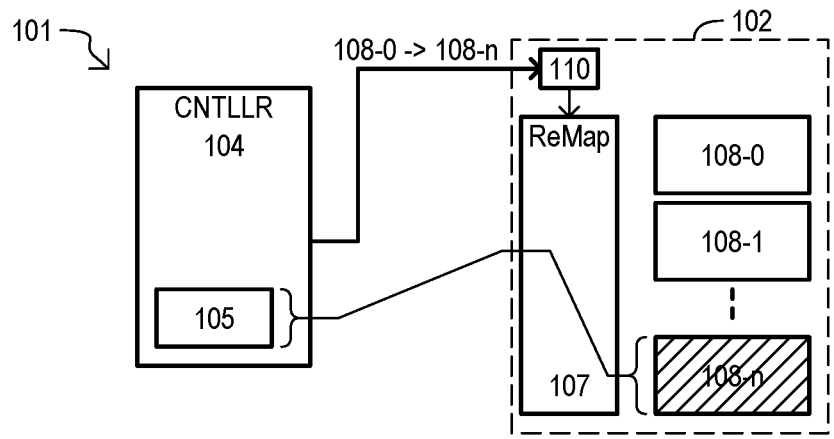
FIG. 1G
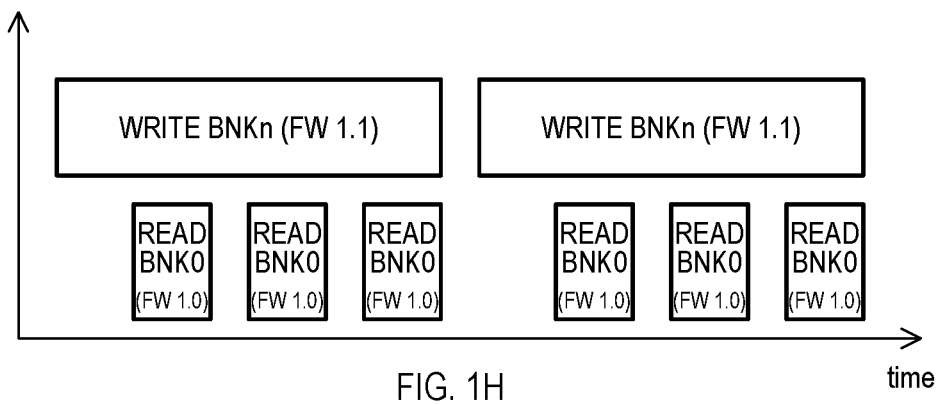
FIG. 1H
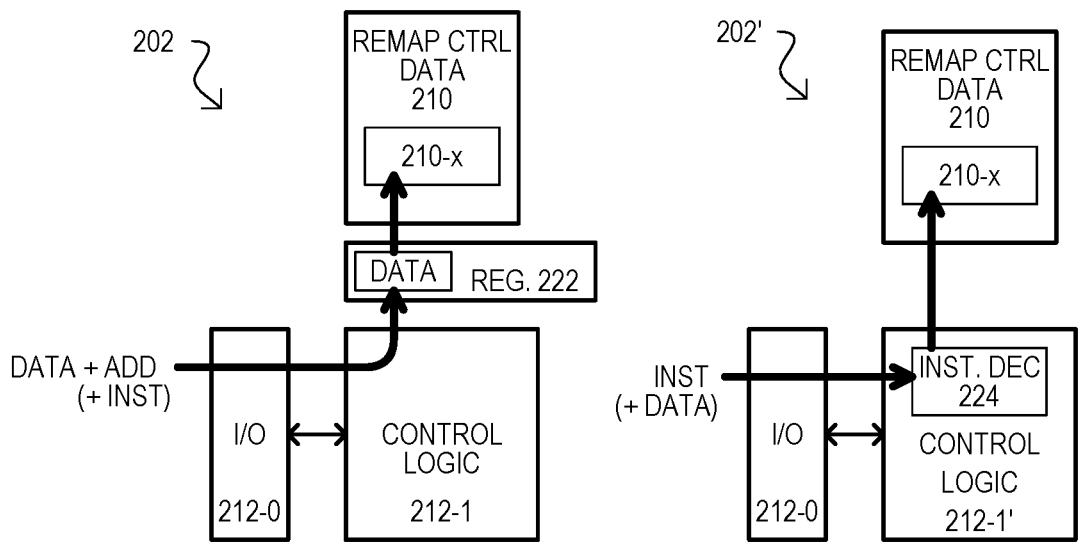
FIG. 2A
FIG. 2B

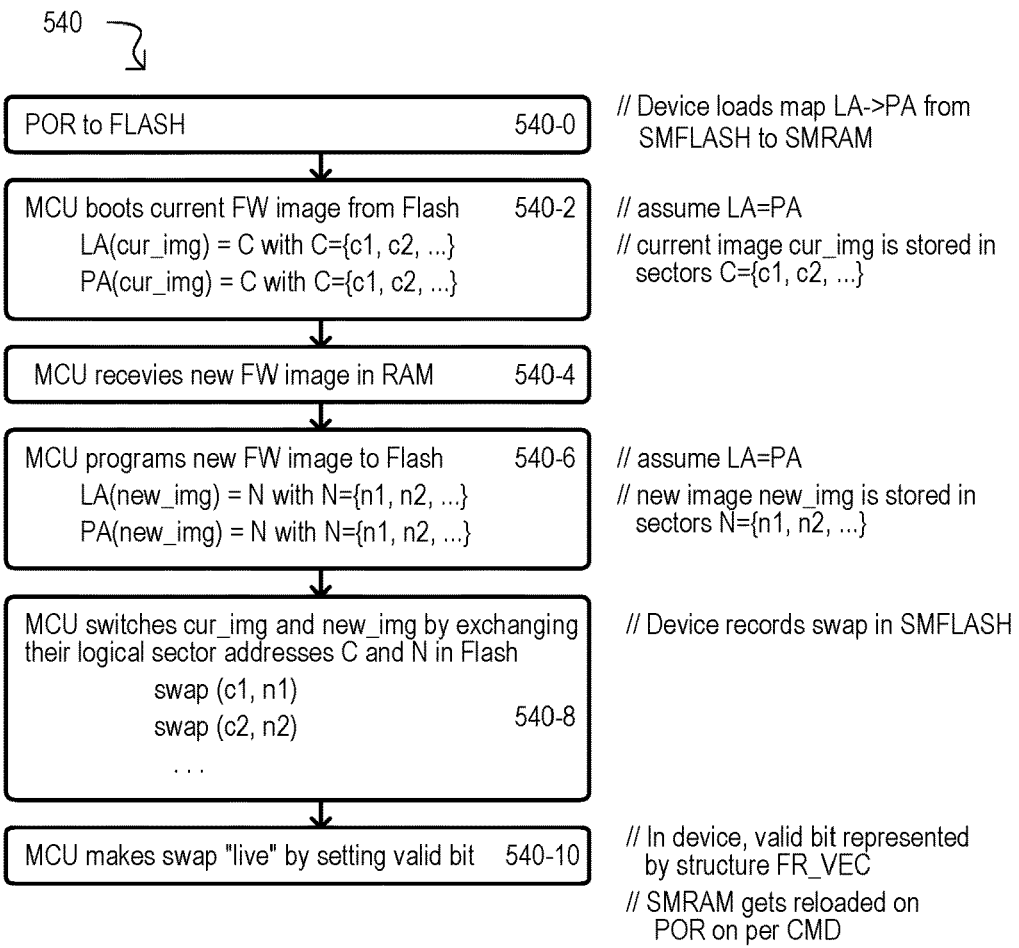
FIG. 5
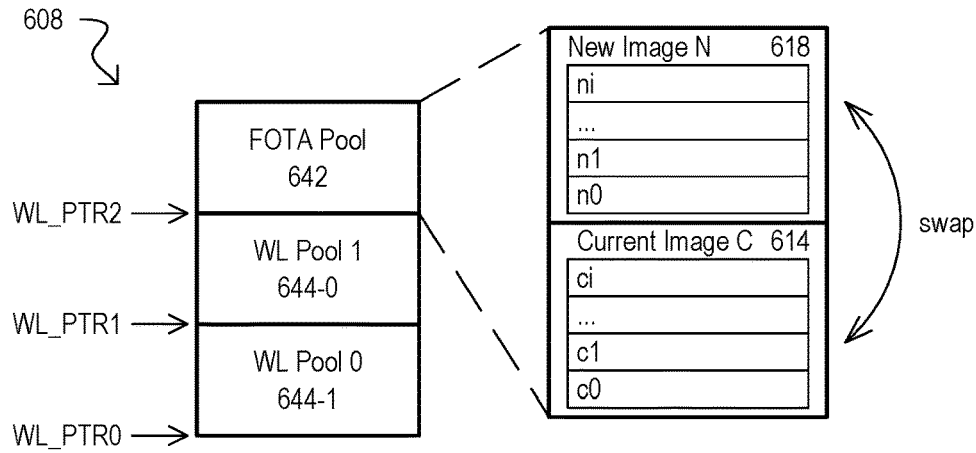
FIG. 6A
FIG. 6B (BACKGROUND)

(BACKGROUND)

MEMORY DEVICES, SYSTEMS, AND METHODS FOR UPDATING FIRMWARE WITH SINGLE MEMORY DEVICE

This application is a continuation-in-part of U.S. patent application Ser. No. 16/735,177, filed on Jan. 6, 2020, now U.S. Pat. No. 11,061,663, which is a continuation of U.S. patent application Ser. No. 16/005,262, filed Jun. 11, 2018, now U.S. Pat. No. 10,552,145, which claims the benefit of U.S. provisional patent application having Ser. No. 62/597,709, filed on Dec. 12, 2017, the contents all of which are incorporated by reference herein.

TECHNICAL FIELD

The present disclosure relates generally to systems that update data in nonvolatile memories from time to time, and more particularly to systems that update firmware images for system use, such as systems utilizing firmware-over-the-air (FOTA) methods.

BACKGROUND

Firmware-over-the-air (FOTA), and other firmware update methods, can be a key requirement for computing systems. FOTA updates typically need to be transparent, i.e., old and new FW image are switched instantaneously. Conventionally, systems that need to update firmware employ two or more separate flash memory devices that are mapped (e.g., via use of base registers) into different ranges of a processor address space. A base address of each different address range controls a single chip select, which selects the desired flash memory device. Thus, the instantaneous switch occurs by swapping the base addresses stored in the base address registers.

FIG. 16A shows a conventional system 1691 that includes FOTA updating. System 1691 can include a microcontroller (MCU) 1693 and multiple flash memory devices 1695-0 to -2. Storage locations within flash memory devices (1695-0 to -2) can be mapped to a system address space 1697. Flash memory device 0 1695-0 can correspond to a base address 0x000 and can store an old firmware image 1607-0 (i.e., an outdated version that has since been replaced). Flash memory device 1 1695-1 can correspond to a base address 0x100 and can store a current firmware image 1697-1 (i.e., a version that is currently accessed by the system). Flash memory device 2 1695-2 can correspond to a base address 0x200 and can store a new firmware image 1697-2 (i.e., a version intended to update current image 1697-1).

MCU 1693 can update the firmware image using addressing mechanisms inside the MCU 1693. MCU 1693 can have base address registers 1699 that store base addresses corresponding to firmware images. Base address registers 1699 are used to generate chip select signal CS0-CS2 for flash memory devices 1695-0 to -2, respectively. Base address register "ba_new_image" can store the base physical address of a new firmware image (0x200 before an update). Base address register "ba_cur_image" can store the base physical address of a current firmware image (0x100 before an update). Base address register "ba_old_image" can store the base physical address of an old firmware image (0x000 before an update).

System 1691 can update from a current image (e.g., 1697-1) to the new image (e.g., 1697-2) by exchanging values in the base address registers 1699. In particular, the value in base address register ba_cur_image can be switched from "cfg_cur" to "cfg_new". Following such an operation, when a system 1691 goes to read the firmware, the addressing mechanisms internal to MCU 1693 will access a base address that generates chip select signal CS2 (instead of CS1, as was done prior to the update operation).

FIG. 16B is a block diagram of a conventional system 1691 showing how chip selects are used. MCU 1693 dedicates an output (e.g., I/O) as a chip select (CS1, CS2) for each flash memory device 1695-0/1. As understood from above, such chip selects (CS1, CS2) can be activated according to values in base addresses registers. One flash memory device (e.g., 1695-0) can store a firmware image that is currently in use, while the other flash memory device (e.g., 1695-1) can store a firmware image that is not currently in use (i.e., an old firmware image, or a new firmware image to be put in use by switching base address register values).

A drawback to conventional FOTA approaches can be cost and limitations in performance. If a typical controller (e.g., MCU) is used that dedicates an I/O as a chip select for each flash memory device (i.e., each firmware image), the controller may not have a free I/O for other needed devices, such as dynamic RAM (DRAM) or static RAM (SRAM). As a result, a controller with additional I/Os may have to be used, which can increase costs of system. While conventional systems can connect multiple flash memory devices to the same bus, with each added flash memory device, capacitive loading on the bus can increase. Thus, the larger the number of flash memory devices on the bus, the slower the bus will perform. As but one example, for an Octal SPI bus, adding two flash memory devices can drop maximum bus speed from 200 MHz to 133-166 MHz, as compared the same bus with only one flash memory device.

Another drawback to conventional FOTA approaches can be lack of compatibility with some controllers. In a conventional system requiring periodic firmware updates, a nonvolatile memory (NVM) array of a memory device (e.g., flash memory device) is partitioned into multiple regions. One region (i.e., Region A) is used to store the current/active image that is executable by a controller (e.g., Host MCU). Another region (i.e., Region B) is used as updatable storage to be programmed during the next firmware update. Region A occupies the lower portion of the device address map and Region B is mapped to the higher region. When a firmware update occurs, Region B gets programmed with the new firmware image, and then needs to be made recognizable as containing the executable image. That is, the newly programmed executable image must be remapped from Region B to Region A.

Some controllers perform this remapping with a hardware swapping mechanism that maps either Region A or Region B in the lower address range where the controller is expecting the executable image to reside. The information indicating the relative locations of Region A and Region B is often stored in reprogrammable NVM within the controller. However, this reprogrammable "swap-indicator" NVM is becoming difficult to integrate into controllers using advanced process nodes. That is, many controllers include only volatile memory arrays and so cannot store swap-indicator data in a nonvolatile fashion.

BRIEF DESCRIPTION OF THE DRAWINGS

FIGS. 1E to 1G are a sequence of block diagrams showing another system and operations according to an embodiment.

FIG. 1H is a diagram showing accesses to different banks for a memory device that can be included in embodiments.

FIGS. 2A and 2B are block diagrams showing how update operations can include a memory device receiving instructions and/or register writes.

FIG. 5 is a flow diagram showing a firmware update operation according to an embodiment.

FIGS. 6A and 6B show a memory cell array configuration that can be included in embodiments.

DETAILED DESCRIPTION

Figure 1A:
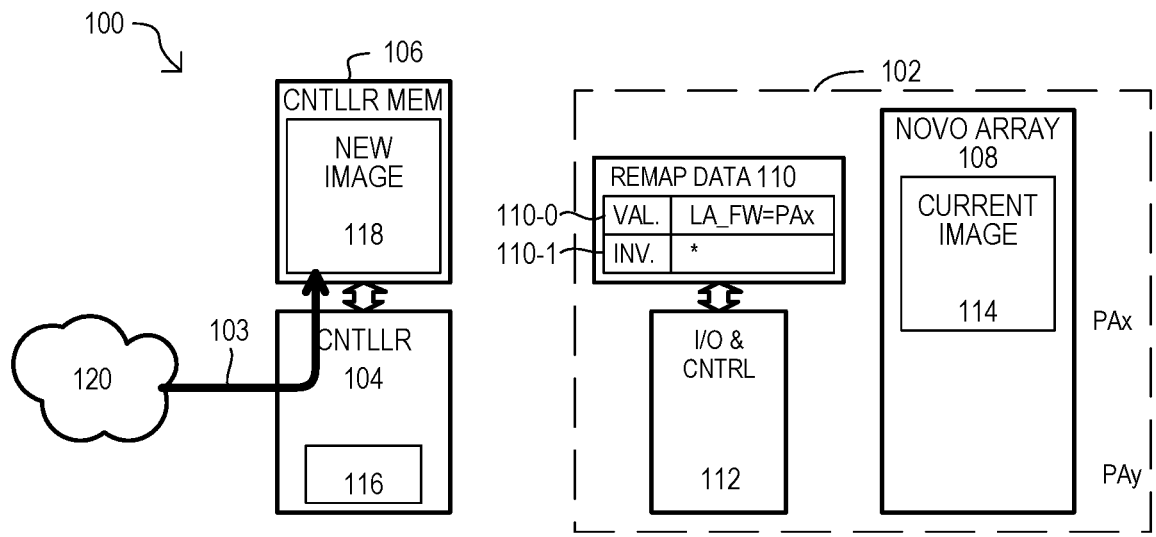
FIGS. 1A to 1D are a sequence of block diagrams showing a system and firmware update operations according to an embodiment.

Various embodiments will now be described that show memory devices, systems, and methods for updating firmware of a system. Updates can be performed with a single memory device without copying firmware images between locations on the memory device.

According to embodiments, a new firmware image can be programmed in a same memory device storing a current firmware image. Once the new firmware image is stored, the memory device can make a switch to a new firmware image by operation of a switching operation that uses an internal remapping data structure. Such a switch to a new firmware image can be instantaneous.

In some embodiments, a switch between firmware images can be established by the controller (e.g., host) device.

In the various embodiments below, like items are referred to by the same reference characters, but with the leading digit(s) corresponding to the figure number.

FIGS. 1A to 1D are a series of flow diagrams showing a system 100 and a corresponding firmware update operation. A system 100 can include a memory device 102, a controller 104, and controller memory 106. A memory device 102 can include a nonvolatile memory array 108, remap data structure 110, and input/output (I/O) and control circuit 112. Nonvolatile memory array 108 can include a number of nonvolatile memory cells that can store data in a nonvolatile manner. That is, in the absence of power, stored data values can be retained. Storage locations are accessible via a physical address (PA). Nonvolatile memory array 108 can include any suitable type of nonvolatile memory cells, but in some embodiments can include "flash" type memory cells. Nonvolatile memory array 108 can have sufficient storage capacity for at least two or more firmware images.

Remap data structure 110 can store data that records a logical address to physical address (LA->PA) mapping of firmware images, as well as a status for each such LA->PA mapping. For example, entry 110-0 stores a mapping (LA_FW=PAx) that is valid, as shown by the VAL indication. Entry 110-1 stores a mapping that is not valid, as shown by the INV indication. It is noted that remap data structure 110 resides on the memory device 102, and stores data in a nonvolatile fashion. As will be shown in other embodiments below, in some embodiments, remap data structure 110 can include a LA->PA look-up or other structure that is stored in volatile memory (not shown) for fast translation between logical and physical addresses. Remap data structure 110 can utilize nonvolatile memory cells located outside of nonvolatile memory array 108 and/or nonvolatile memory cells located within nonvolatile memory array 108.

In some embodiments, memory device 102 can be a single integrated circuit device. In such an arrangement, nonvolatile memory array 108, remap data structure 110, and I/O and control circuit 112 can be part of the same integrated circuit package. In particular embodiments, nonvolatile memory array 108, remap data structure 110 and I/O and control circuit 112 can be part of the same integrated circuit substrate (i.e., formed in a single "chip").

I/O and control circuit 112 can enable access to nonvolatile memory array 108 and remap data structure 110. For accesses to firmware stored in nonvolatile memory array 108, I/O and control circuit 112 can use remap data structure 110 to determine which LA->PA mapping is valid, and then use such a mapping to direct logical addresses to physical addresses of the valid firmware image.

In some embodiments, in response to predetermined actions (e.g., power-on/reset POR, a received instruction, a register setting), memory device 102 can access remap data structure 110 to create a LA->PA mapping structure in volatile memory (not shown).

A controller 104 can include logic circuits for executing various functions of system 100. In some embodiments, controller 104 can include one or more processors and related circuits that can execute stored instructions 116. However, alternate embodiments can include any other suitable circuits, including custom logic and/or programmable logic. A controller 104 can have access to a controller memory 106 which is different from memory device 102. A controller memory 106 can be formed of any suitable memory circuits, and in particular embodiments can be a volatile memory, such as dynamic random access memory (DRAM) or static RAM (SRAM).

Having described components of a system 100, an update operation for system 100 will now be described.

Referring to FIG. 1A, a system 100 may initially store a current firmware image 114 in nonvolatile memory array 108 starting at a physical address PAx. During system operations, the current firmware image 114 is read from memory device 102 by I/O and control circuit 112 translating logical addresses (which can start at LA_FW) to physical addresses (which can start at PAx) by accessing remap data structure 110.

Referring still to FIG. 1A, a system 100 can receive a new firmware image (shown by action 103). Controller 104 can store the new firmware image 118 in controller memory 106. New firmware image 118 can be received from a network 120. In some embodiments, network 120 can be a wireless network, and an update operation can be a FOTA operation. However, in other embodiments, a network 120 can be another device, and an update operation can be via a wired connection.

Figure 1B:
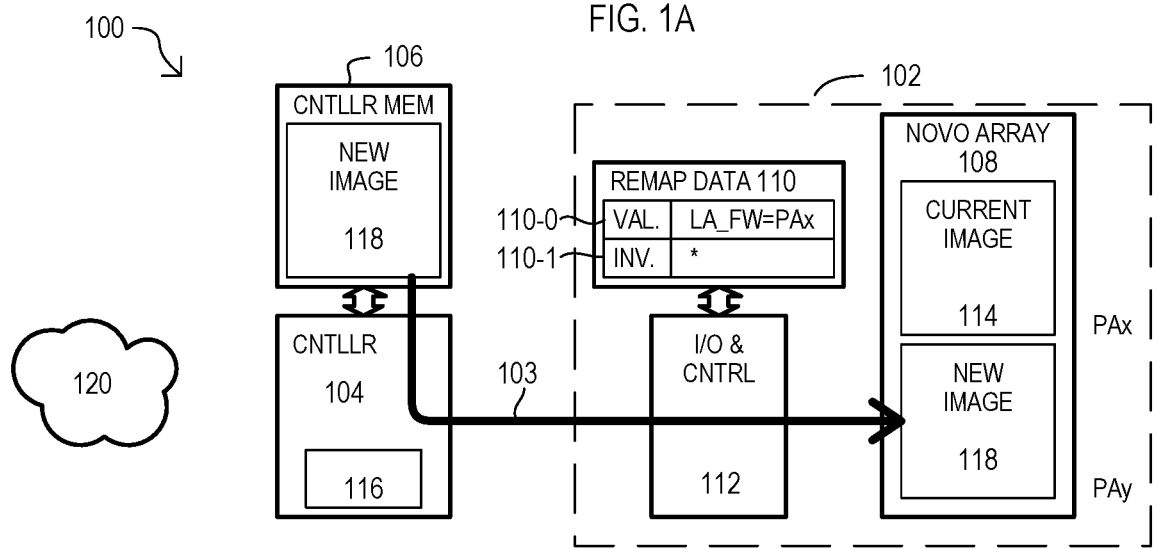

Referring to FIG. 1B, controller 104 can program the new firmware image 118 into nonvolatile memory array 108. It is understood that new firmware image 118 is programmed into physical locations not occupied by current firmware image 114. In the embodiment shown, new firmware image 118 can occupy a range of a physical addresses starting at PAy that do not overlap with the physical addresses storing the current firmware 114 starting at PAx. New firmware image 118 can be programmed according to any technique suitable for the type and architecture of the nonvolatile memory array 108. In some embodiments, physical addresses for new firmware image 118 can be generated by controller 104. However, in other embodiments, such physical addresses can be generated by I/O and control circuit 112 in response to one or more instructions from controller 104.

Figure 1C:
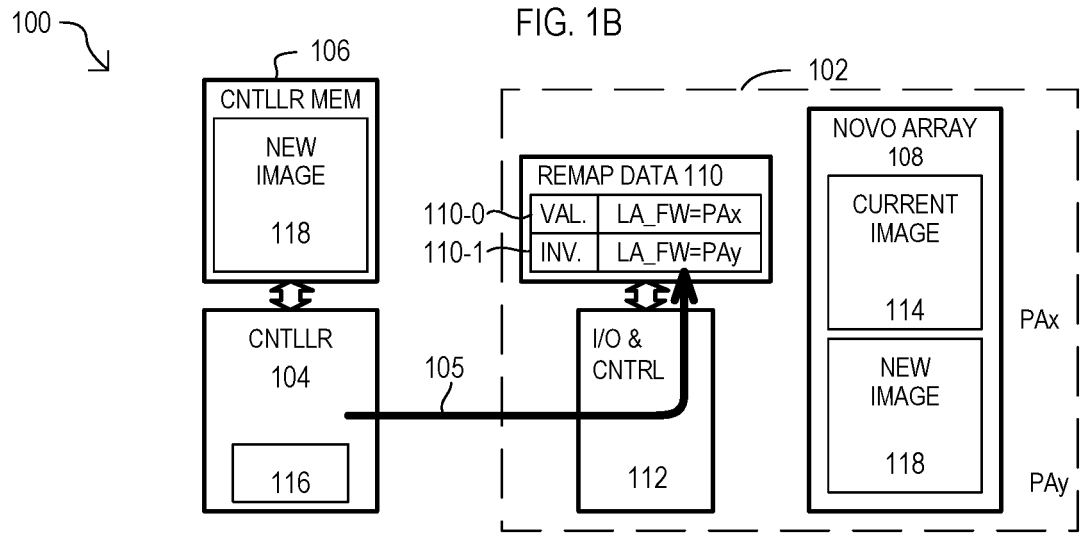

Referring to FIG. 1C, controller 104 can also program a logical to physical address mapping of the new firmware image 118 into remap data structure 110. Such an action is shown in FIG. 1C by "LA_FW=PAy" being programmed into entry 110-1. In this way, logical address intended to access firmware for the system 100 can be assigned physical addresses of the new image 118. However, as shown in FIG. 1C, such a mapping will not be effect, as entry 110-1 continues to have an invalid status.

Figure 1D:
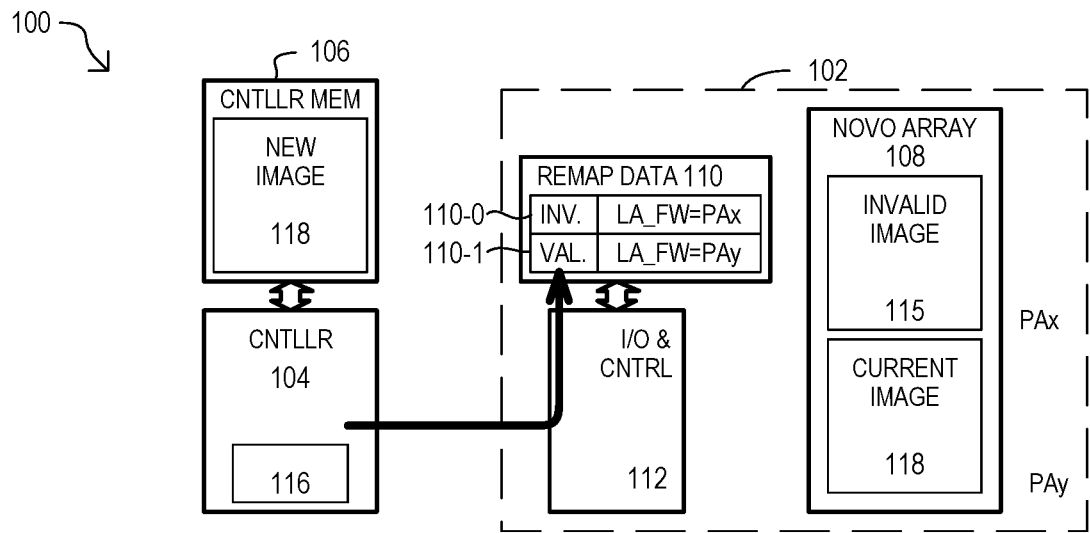

Referring to FIG. 1D, controller 104 can make a new firmware image "live" by programming the new mapping entry to be valid. Such an action is shown in FIG. 1D by entry 110-1 being changed to valid (VAL.) and entry 110-0 becoming invalid. As shown in nonvolatile memory array 108, once the new mapping is live, the firmware image at PAx becomes an invalid (e.g., outdated) firmware image 115, and the firmware image 118 at PAy becomes the current firmware image, to be accessed by the system.

Once a new firmware image becomes valid (e.g., is live), it can be accessed immediately, or in response to predetermined conditions. As but a few of many possible examples, the new mapping can take effect after any or all of the following: a next power-up or reset (POR) operation of the device or system, the memory device 102 receiving a predetermined instruction, or a predetermined value being written into a configuration register (not shown) of the memory device 102.

An operation like that shown in FIGS. 1A to 1D can enable an update to firmware to be transparent and immediate, and not require a copying of data between locations within a same memory device. It is noted that in some embodiments, a memory device 102 can retain two locations for firmware, and "swap" between the two with each new firmware image. However, in other embodiments a memory device 102 can include more than two storage locations for firmware, and cycle among the various locations as new firmware is received.

While a controller 104 can track the physical addresses for firmware locations, in some embodiments, I/O & control logic 112 can handle such tasks, generating physical addresses for firmware data values received from a controller 104.

Figure 1E:
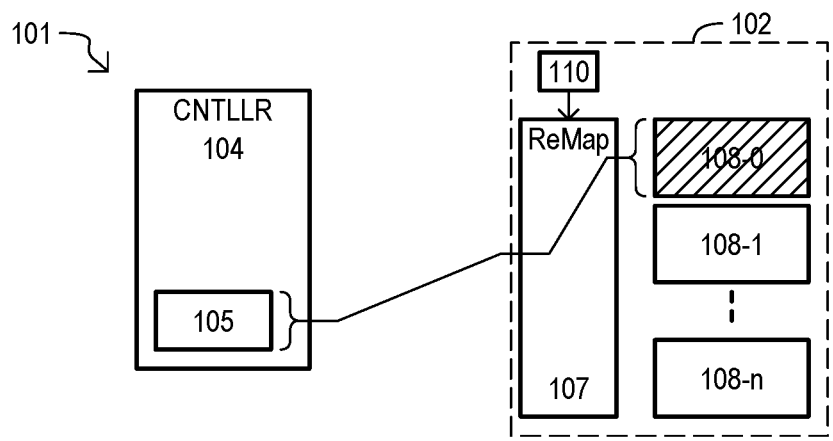
Figure 1F:
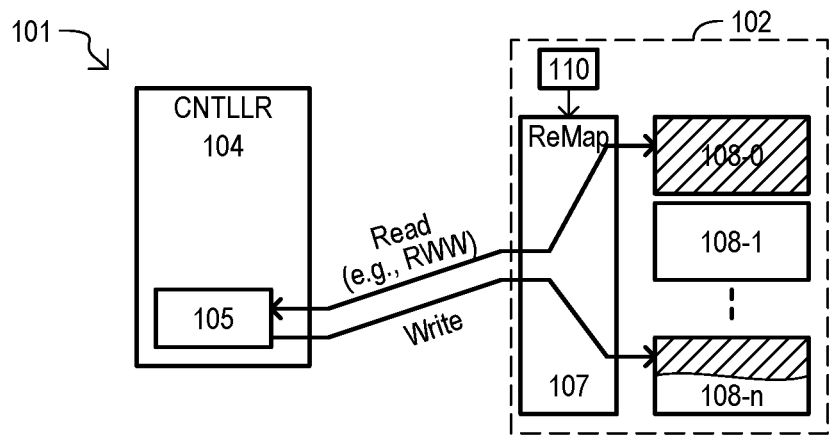

FIGS. 1E to 1G are a series of diagrams showing a system 101 and a corresponding firmware update operation according to another embodiment. A system 101 can include a memory device 102 and a controller 104. A memory device 102 can include nonvolatile memory (NVM) cell regions 108-0 to 108-n, remap circuits 107, and a remap data store 110. In some embodiments, regions (108-0 to -n) can be logical divisions and/or physical divisions of nonvolatile storage locations of the memory device 102. In some embodiments, regions (108-0 to -n) can be separately accessible, including accesses to one region (e.g., writes, programs or erases) that can overlap in time with accesses to other regions (e.g., reads). Remap circuits 107 can be configured to vary which addresses access which regions (108-0 to -n). In the embodiment shown, how remap circuits 107 map addresses can vary according to values of remap store 110.

A controller 104 can include a controller memory space 105 having addresses that are mapped to addresses of memory device 102. In some embodiments, to access instructions, a controller 104 can access memory space 105. In some embodiments, a controller 104 can operate in an execute-in-place fashion, executing instructions directly from memory device 105 102.

Having described components of a system 101, an update operation for system 101 will now be described.

Referring to FIG. 1E, a controller 104 can have an address space 105 for accessing instructions for execution (e.g., firmware). Remap circuits 107 can be configured (by data in remap store 110) to map controller address space 105 to region 108-0 of memory device 102. Referring to FIG. 1F, updated instructions can be written (e.g., programmed) into another region 108-n of memory device 102. In some embodiments, such a write operation can be performed by a controller 104. However, in other embodiments, updated instructions can be written by another device (e.g., a device that shares a bus with memory device 102). In some embodiments, regions (108-0 to 108-n) can be bank-like structures, where accesses to different banks can overlap in time. In the embodiment shown, a read operation can be made to region 108-0 (e.g., controller access), while write operations are occurring to region 108-n. This can include controller 104 executing a read-while-write (RWW) operation. Such a RWW operation can include reading instructions for execution from region 108-0, while writing updated (e.g., new) instructions to region 108-n.

Referring to FIG. 1G, a complete set of updated instructions has been written to region 108-n. A controller 104 can set data within remap store 110 that causes remap circuit 110 to map controller address space 105 to region 108-n, instead of region 108-0. As a result, when a controller 104 executes instructions of address space 105, it can access the updated instructions of region 108-n FIG. 1H is a timing diagram of NVM device accesses that can occur according to embodiments. Write (e.g., program, erase) operations can occur to one bank (BNKn) to store updated instructions (FW 1.1.) for execution by a processor device. Such write operations can be initiated by instructions from a controller device (or other device) directed to particular addresses. At the same time, while write operations are taking place to one bank (BNKn), read operations can occur at another bank (BNK0) to access a current set of instructions (FW 1.0). Such read operations can be executed by a controller device. Once all of updated instructions (FW 1.1) have been written into a memory device, a controller can change an address mapping of the memory device to access the updated instructions for execution.

Embodiments shown herein can include various actions executed by a memory device, including the programming of firmware data into nonvolatile memory array locations, the programming of values into a remap data structure (e.g., LA to PA mapping data, status values, etc.), and making a new version of the firmware "live" (i.e., available to the system). While such actions can be accomplished in any suitable way, FIGS. 2A and 2B show two approaches according to embodiments.

FIGS. 2A and 2B are block diagrams of memory devices 202 and 202'. In particular embodiments, memory devices 202/202' can be particular implementations of those shown as 102 in FIGS. 1A to 1G.

FIG. 2A shows the writing of data to a configuration register 222 in a memory device 202. Memory device 202 can include an I/O circuit 212-0, control logic 212-1, remap data structure 210, and a configuration register 222. A data value DATA can be written to configuration register 222 to start or enable an action in a firmware update operation, or to change an address mapping. As but a few examples, according to the register setting any or all of the following can happen: a new firmware image can be made "live", PA->LA mapping data (210-x) can be programmed or addresses can be remapped in any suitable manner, the memory device can be placed into a mode which enables PA->LA mapping data to be programmed, the memory device can be placed into a mode which enables a controller to program the new firmware into storage locations (i.e., access physical addressing). Writing to the configuration register 222 can include providing memory device with data and a register address (DATA+ADD). Further, such an action can also include an instruction (e.g., write register, etc.).

FIG. 2B shows a memory device 202' receiving particular instructions for firmware update operations. Memory device 202' can include the same items as that of FIG. 2A. However, unlike FIG. 2A, actions in a firmware update operation can be effected by a dedicated instruction to the memory device 202'. Accordingly, control logic 212-1' can include an instruction decoder 224. In response to one or more instructions, control logic 212-1' can perform any of the actions noted for the register write of FIG. 2A (i.e., make new firmware live, etc.). In some embodiments, an instruction (INST) can be accompanied by one or more data values (+DATA).

Figure 3:
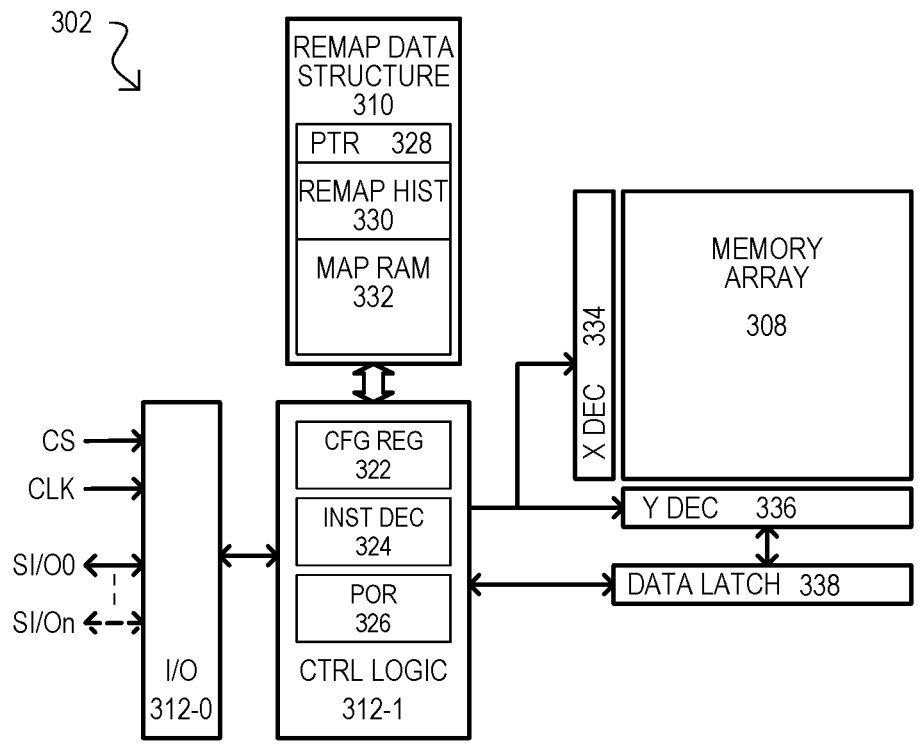
FIG. 3 is a block schematic diagram of a memory device according to an embodiment.

FIG. 3 is a block diagram of memory device 302 according to a further embodiment. In particular embodiments, FIG. 3 can be one implementation of that shown as 102 in FIGS. 1A to 1G, or those shown in FIGS. 2A/B.

Memory device 302 can include an I/O circuit 312-0, control logic 312-1, remap data structure 310, a memory cell array 308, X and Y decoders 334 and 336, and data latch 338. I/O circuit 312-0 can provide any suitable interface for memory device 302, and in the very particular embodiment shown, can include a chip select input CS, a clock input CLK, a serial I/O (SI/O0), and optionally one or more additional serial I/Os (SI/On). According to well understood techniques, a memory device 302 can be accessed by an active CS signal, and can receive any of instructions, address values, or data values on SI/O0 (and SI/On) in synchronism with a clock received at CLK. However, such a particular interface should not be construed as limiting. Alternate embodiments can include an I/O circuit with various interfaces, including those with dedicated address and data lines, asynchronous timing, parallel buses, etc.

Remap data structure 310 can store data, in a nonvolatile fashion, to track and enable access to a latest firmware image and/or remap addresses which access particular regions of a memory device. In the embodiment shown, remap data structure 310 can include pointer data 328, remap history data 330, and a map memory 332. Remap history data 330 can store LA->PA mapping data for each new firmware image as it is programmed into memory cell array 308. Thus, remap history data 330 can store a history of all mappings for a particular firmware (where an oldest entry may eventually be overwritten). Pointer data 328 can point to the most recent remap history data entry, and thus the entry of the most recent firmware image. Data in map memory 332 can be accessed at a faster speed than remap history data 330 and can be configured to provide rapid LA->PA conversion. In some embodiments, map memory 332 can be a volatile memory structure that is populated with remap history data 330 pointed to by pointer data 328. In some embodiments, pointer data 328 and remap history data 330 are stored in nonvolatile memory circuits. Such nonvolatile memory circuits can be part of memory cell array 308 or separate from memory cell array 308. Map memory 332 can include volatile memory circuits, such as SRAM and/or DRAM.

Control logic 312-1 can execute operations of the memory device 302 according to signals received at I/O circuit 312-0. In the embodiment shown, control logic 312-1 can include POR circuit 326, instruction decoder 324, and configuration registers 322. POR circuit 326 can detect and/or initiate a power-on or reset operation. Instruction decoder 324 can decode instructions received at I/O circuit 312-0. Configuration registers 322 can store configuration data that can dictate how memory device 302 operates. In some embodiments, a new firmware image can be placed in operation in response to any of: POR circuit 326 detecting a power on or reset event, the decoding of one or more instructions by instruction decoder 324, or the writing of a predetermined data value into configuration registers 322. Placing the new firmware image into operation can include control logic 312-1 accessing pointer data 328 to find the LA->PA mapping for the most recent firmware from remap history data 330. Control logic 312-1 can then create a LA->PA lookup structure in map memory 332 from the remap history data 330. Control logic 312-1 then access map memory 332 to service read requests made to firmware logical addresses.

A memory cell array 308 can include nonvolatile memory cells accessed according to physical addresses decoded by X and Y decoders (334/336). Nonvolatile memory cells can be of any suitable technology, and in particular embodiments can be single transistor "flash" type memory cells. Memory cell array 308 can have any suitable organization, and in particular embodiments can be organized in sectors.

Data latch 338 can store read data received from memory cell array 308 for output by control logic 312-1 over SI/O0 (and SI/On if present). Data latch 338 can also store write data received over SI/O0 (and SI/On if present), for programming into memory cell array 308 by control logic 312-1.

Figure 4:
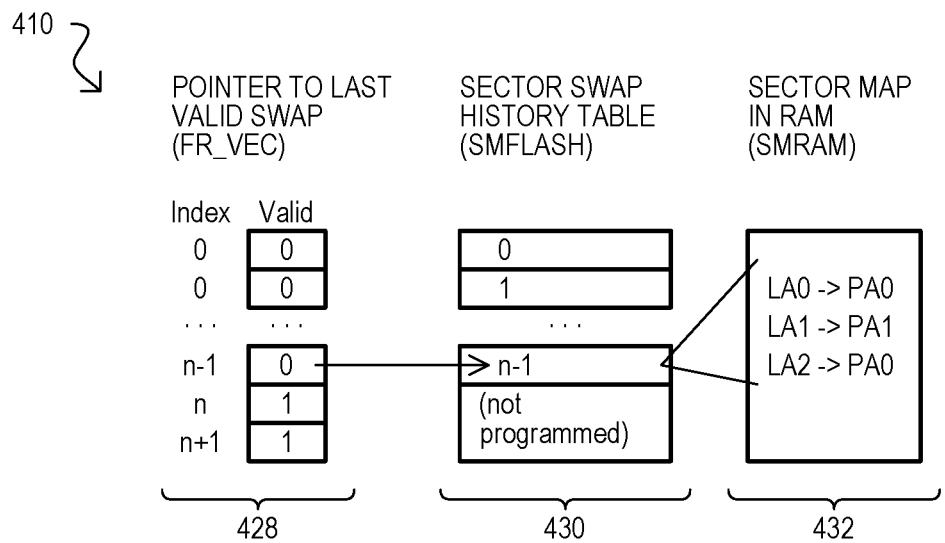
FIG. 4 is a diagram showing a memory device remap data structure according to an embodiment.

FIG. 4 is a diagram showing a remap data structure 410 according to one particular embodiment. Remap data structure 410 can be one particular implementation of those shown for other embodiments herein. Remap data structure 410 can include pointer data (FR_VEC) 428, remap history data (SMFLASH) 430, and map memory (SMRAM) 432. Pointer data 428 can include a bit value that indexes to each entry in remap history data 430. The last bit value of pointer data 428 having a "0" value can be the latest entry. Thus, in FIG. 4, pointer data 428 indexes to entry "n−1" as storing the LA->PA mapping for the newest firmware version. Thus, the data stored in map memory 432 is understood to be derived from data stored in entry n−1 of remap history data 430.

When a new firmware image is received, its LA->PA mapping can be programmed into entry "n", and to make such a new firmware image "live" the pointer bit value for index n can be changed from 1 to 0.

Having described various systems, devices, and corresponding methods above, another method will now be described with reference to FIG. 5. FIG. 5 is a flow diagram of a method 540 of updating firmware with a controller and a single memory device. A method 540 can be executed by any of the systems described herein, and equivalents. In method 540 a memory device can be flash memory device, but other embodiments can include nonvolatile storage based on any other suitable technology.

Method 540 can include a memory device experiencing an initializing event, which in the embodiment shown can be a POR type event 540-0. In response to such an event, a memory device can load an LA->PA mapping from a remap history (e.g., SMFLASH) into map memory (e.g., SMRAM). Other initializing events that can result in the same operation (populating SMRAM) can include specific instructions or commands to the memory device, or the setting of one or more configuration registers of the memory device, as but a few examples.

A controller (e.g., MCU) can boot a current firmware image 540-2. Such an action can include a controller setting LAs to values of the last known firmware image. In addition, a controller may also have record of the physical addresses (in the memory device) of the latest image. In the embodiment shown, it is assumed that current logical addresses equal the current physical addresses. In FIG. 5, the current firmware image is understood to be stored in sectors "C" which includes physical addresses c1, c2, etc.

A controller can receive a new firmware image 540-4. Such an action can include any of those described herein, or equivalents, including receiving the new firmware image over a wired or wireless connection and storing it in a controller memory (RAM).

A controller can program the new firmware into the memory device 540-6. Such an action can include the controller assigning and recording logical and physical addresses for the data. In the embodiment shown, it is assumed that the assigned logical addresses equal the assigned physical addresses. In FIG. 5, the new firmware image is understood to be stored in sectors "N" which includes physical addresses n1, n2, etc. Sectors "N" are understood to be different from and not overlap with sectors "C". Action 540-6 shows how in some embodiments, the LA->PA mapping can be exposed to an application/user.

A controller can then update remap history data (SMFLASH) on the memory device to store the new firmware image location 540-8. Such an action can include a controller exchanging logical addresses of the current firmware image with those of the new firmware image. In FIG. 5, this can include multiple logical address swaps.

A method 540 can further include a controller making the firmware update "live" by setting a valid bit in the memory device 540-10. In FIG. 5 this can include setting a bit in a data structure like that of FIG. 4 (i.e., a bit value in pointer FR_VEC). In some embodiments, a controller may not need a separate action to make a firmware update live. For example, updating remap data (e.g., 540-8) can result in the firmware update going live. Alternatively, following the updating of remap data, a firmware update can go live in response to a predetermined event (e.g., POR).

With the new firmware image live, when the memory device experiences another initializing event 540-0 (e.g., POR, special instruction/command, configuration register write), the controller will boot the new image, i.e., LA(cur_img)=N with N=(n1, n2, . . . ). The firmware update is thus immediately in effect.

FIGS. 6A and 6B are diagrams showing configurations for a memory cell array 608 that can be included in embodiments. FIG. 6A shows a memory cell array 608 that is physically divided into different pools 642, 644-0, 644-1. Each pool (642, 644-0, 644-1) is addressable by a pointer (WL_PTR0 to 2), which can point to a base address for the pool. One pool 642 can be designated as a firmware pool 642, having a size that can accommodate at least two firmware images. As shown, firmware pool 642 can be programmed with a new firmware image 618 (at physical addresses n0 to ni) while still storing a previous firmware image 614 (at physical addresses c0 to ci). In some embodiments, as firmware is continually updated, locations can be swapped. For example, once new firmware image 618 is made live, it will become the current firmware image, and the next, new firmware image will be programmed at physical addresses c0 to ci.

FIG. 6B shows a swapping operation. A logical address for a new firmware image is stored as a temporary value (tmp=LA(new_img)). The logical address for a new firmware image is set to that of the current firmware image (LA(new_img)=LA(cur_img)). Such an action designates the (now outdated) current firmware image, as the destination for the next, new firmware image. The newly received firmware image is then set as the current firmware image (LA(cur_img)=tmp).

Of course, in other embodiments, a firmware pool 642 can accommodate more than two firmware images, and thus updates will rotate through address ranges rather than swap between just two address ranges.

Referring back to FIG. 6A, in some embodiments, the pools (642, 644-0, 644-1) can be wear leveling pools. A memory device that includes memory cell array 608 can change logical to physical address mapping to even out wear among the pools. In some embodiments, a firmware pool 642 can be treated as any other pool (e.g., 644-0/1) in a wear leveling operation. That is, once accesses to firmware pool 642 have exceeded some predetermined threshold, a new pool (e.g., 644-0/1) can be designated as the firmware pool. In such embodiments, firmware images can be stored in a same pool to avoid losing mapping data if a wear leveling operation cycles a pool out of operation and substitutes it with a different pool.

Figure 7:
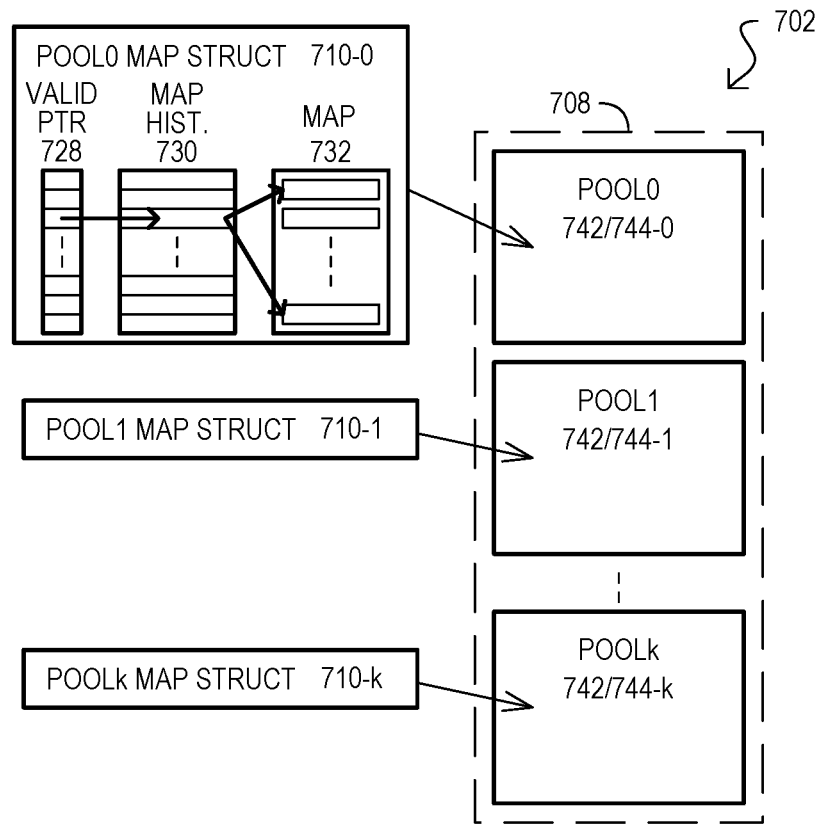
FIG. 7 is a block diagram showing data structures and a corresponding memory cell array that can be included in embodiments.

Referring to FIG. 7, a memory device 702 according to another embodiment is shown in a block diagram. A memory device 702 can be one particular implementation of any of those shown herein. A memory device 702 can include a memory cell array 708 divided into pools 742/744-0 to -k. For each pool (742/744-0 to -k) there can be corresponding remap structure 710-0 to -k. Remap structures (710-0 to -k) can take the form of any of those described herein, or equivalents, and in FIG. 7 are shown to have a structure like that of FIG. 4.

In some embodiments, pools (742/744-0 to -k) can be wear leveling pools, and thus subject to be rotated out of use based on wear leveling criteria. In memory device 702 of FIG. 7, any pool (742/744-0 to -k) can serve as firmware pool as there is a corresponding remap data structure for that pool.

Figure 8A:
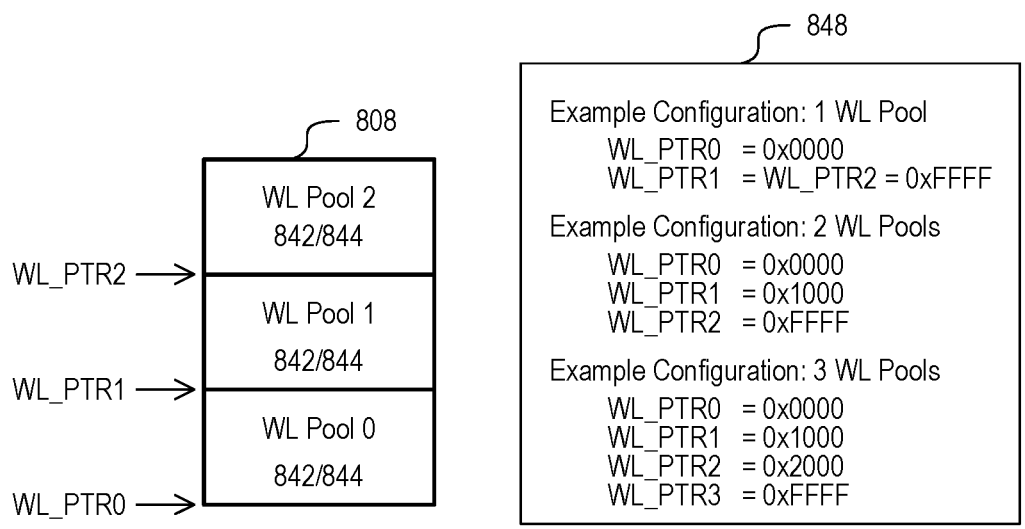
FIG. 8A shows a memory cell array that can be divided into a varying number of pools which can be included in embodiments.

In some embodiments, a memory cell array can have physical regions of programmable size. FIG. 8A shows one example of such a memory cell array 808. Memory cell array 808 can include a number of storage locations dividable into different regions, shown as pools 842/844. A size and physical location of the pools can be programmable according to a pointer value (WL_PTRO to -2), which can point to a base physical address. In some embodiments, such pools can be wear leveling pools. Thus, accesses to such pools can be monitored or otherwise tracked to cycle out a pool that has been subject to more use than other pools, and remap addresses to a new, less worn pool.

FIG. 8A includes examples 848 of how a memory cell array 808 can be divided using pointer values (WL_PTRO to -2). Examples 848 include only one pool, two pools, and three pools. Of course, any number of pools could be created, provided sufficient pointer values are available. In such an arrangement, a pool can be adjusted in size according to firmware size (i.e., made large enough to store at least two images).

Figure 8B:
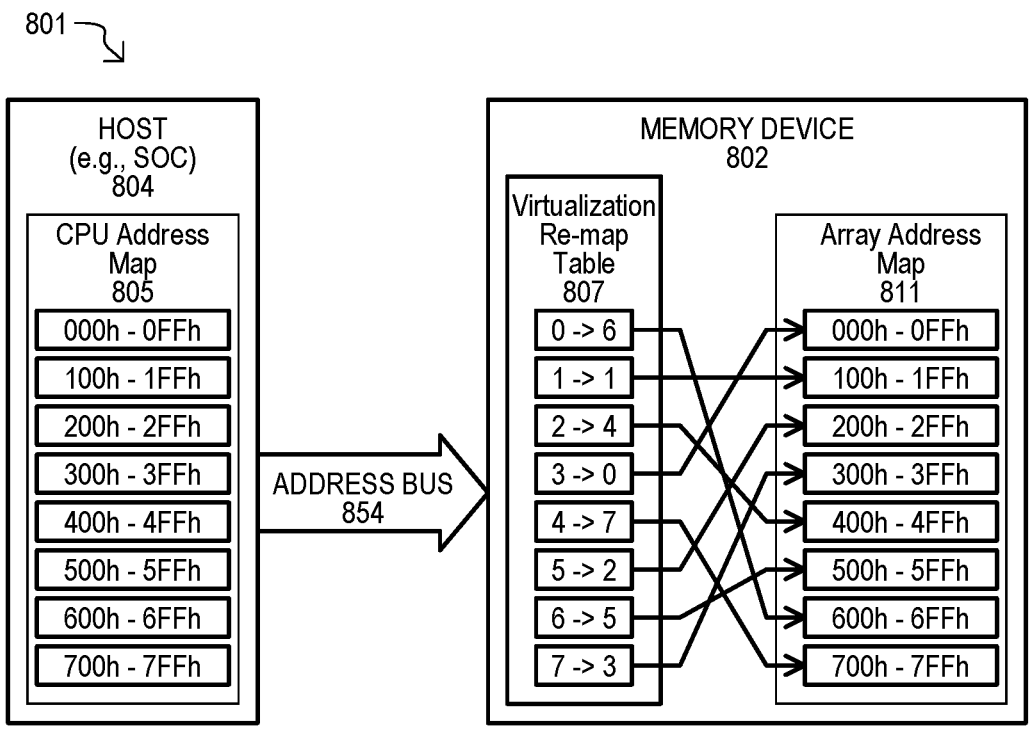
FIGS. 8B to 8D are block diagrams showing a system and operations according to another embodiment.
Figure 8C:
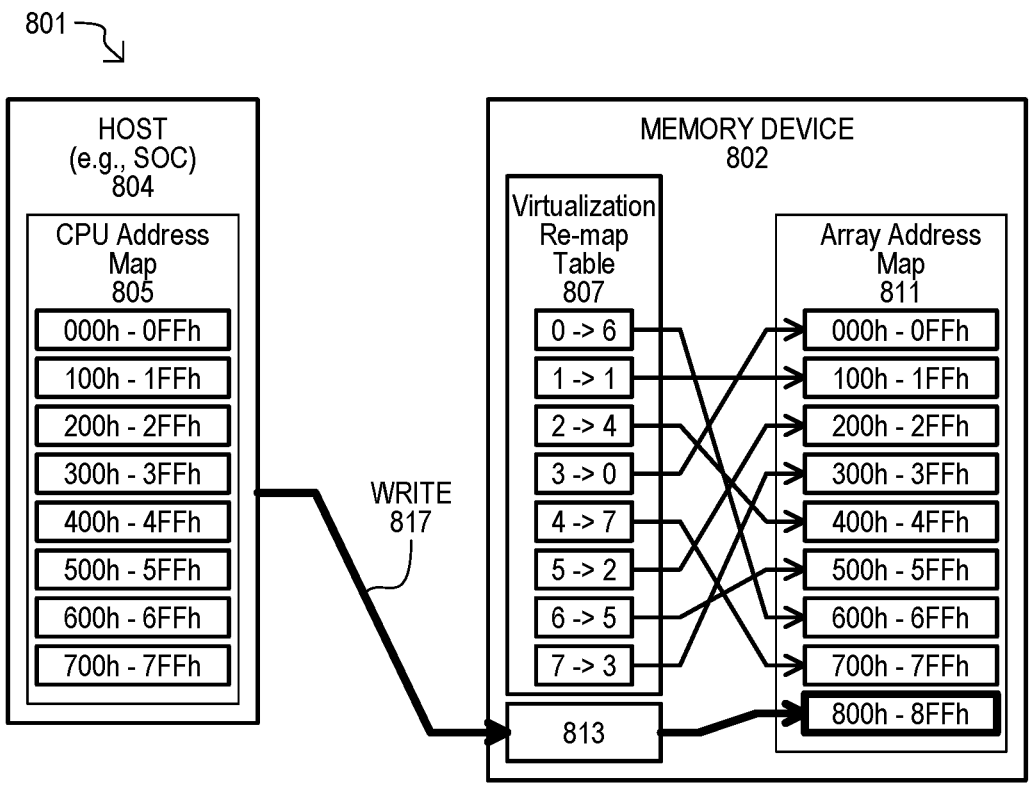
Figure 8D:
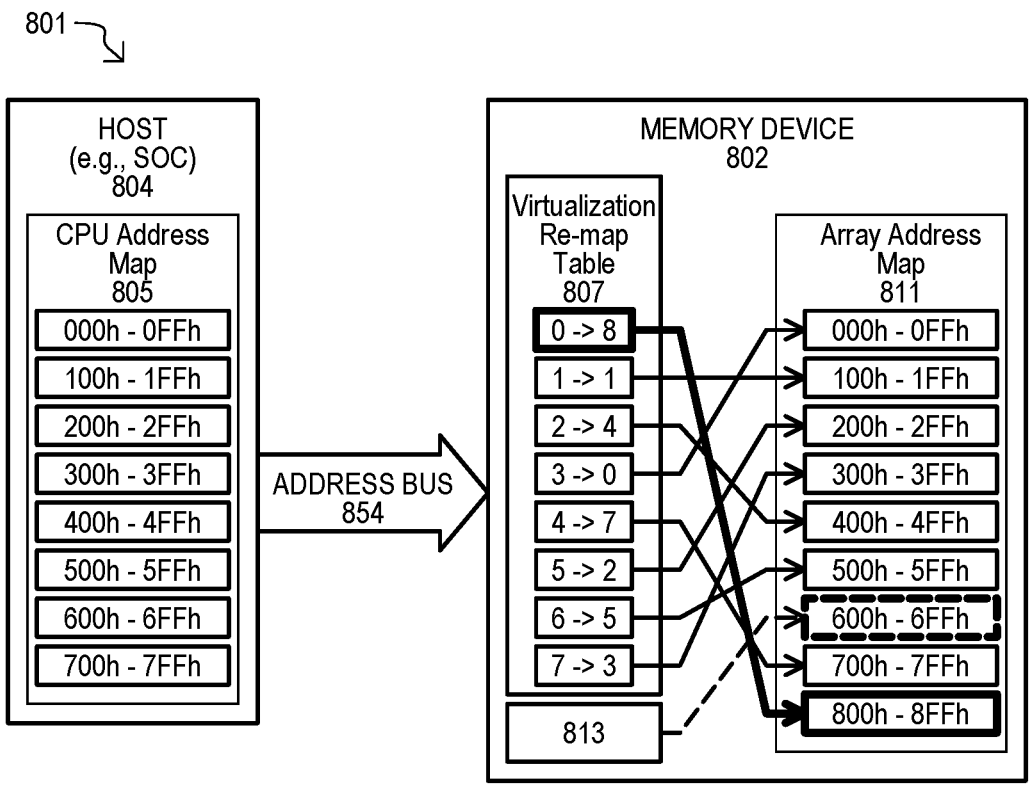

FIGS. 8B to 8D are block diagrams showing a system 801 and operations according to further embodiments. A system 801 can be one implementation of that shown in FIGS. 1E to 1G. A system 801 can include a NVM device 802 and a controller device 804. A NVM device 802 can include a remap table 807 and an array address map 811. A remap table 807 can establish which addresses map to which array regions. In the embodiment shown, the most significant bits of an address can determine which region is accessed. FIGS. 8B to 8D show re-mappable address ranges for array regions in hexadecimal format (256 per region). While regions are shown with equal addressable range sizes, alternate embodiments can have regions with different size address ranges.

FIG. 8B shows a system 801 with an initial mapping of a controller address space 805 to a NVM regions. For example, accesses to controller addresses 000h-0FFh map to array addresses 600h-6FFh. In such an arrangement, when controller device 804 accesses data (e.g., such as firmware) at controller address range 400h-4FFh, the address can be transmitted over address bus 854. The address can then be remapped to a corresponding address in range 700h-7FFh within memory device to access the desired data.

FIG. 8C shows a system 801 as it prepares for a data remapping operation (e.g., a firmware update). FIG. 8C shows an arrangement in which updates can be initially written to an "extra" region of memory device 802. An extra region can be a region that is not typically accessible for normal (i.e., non-update) operations. In the embodiment shown, an extra region can have an address range outside of the address space 805 of the controller and/or outside of the address space indicated as available by the memory device 802. While access to an extra region can be based solely on an address, in some embodiments, a memory device 802 can have access circuits 813 which can control access to the extra region. Access circuits 813 can take any suitable form, including but not limited to, circuits that require the input of a predetermined command and/or key.

FIG. 8D shows a system 801 completing a remapping operation. New instruction data has been written into array address region 800h-8FFh. By operation of controller 804, remap table 807 can be reconfigured to map address range 000h-0FFh to array address map 800h-8FFh. Consequently, accesses by controller 804 to controller memory addresses within range 000h-0FFh will access array address regions 800h-8FFh. Access circuits 813 can now provide a channel to array addresses 600h-6FFh.

Figure 8E:
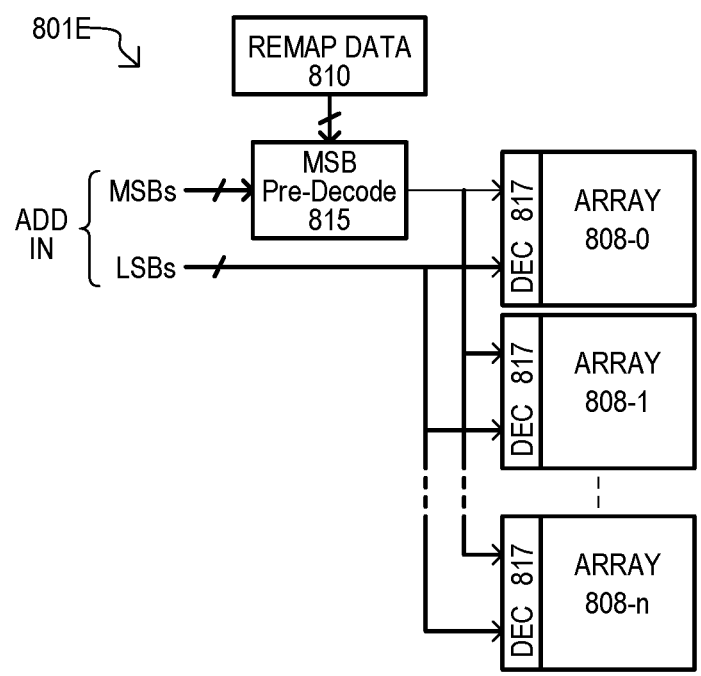
FIG. 8E is a block schematic diagram of a memory device according to an embodiment.

FIG. 8E shows a memory device 801E that can be included in embodiments. A memory device 801E can include a remap data store 810, more significant bit (MSB) predecode circuit 815, decoder circuits 817, and NVM regions 808-0 to 808-n. An input address (ADD IN) can have MSBs and LSBs. MSBs can be decoded by predecode circuit 815 based on remap data 810, and can determine which region (808-0 to -n) is accessed by an address. It is understood that FIG. 8E shows but one example of remapping circuits and should not be construed as limiting.

According to embodiments, memory devices can store mapping data structures which can be accessed and revised to enable rapid switching from a current firmware image to a newly received firmware image. While memory devices can be accessed in any suitable way, and according to any suitable protocol, in some embodiments a memory device can be accessed with a chip select signal (CS) and one or more I/O lines. FIGS. 9A to 9D are timing diagrams showing inputs signals to a memory device for updating firmware according to embodiments. In response to such input signals, a memory device can perform any of: make a new firmware image "live", update remap history data (e.g., add a new LA->PA mapping), prepare the memory device for the programming of a new firmware image.

Each of FIGS. 9A to 9D shows waveforms for a chip select signal (CSB) and I/O signal(s) (I/O). An I/O can be one I/O line of the memory device, or multiple such I/O lines. In the example shown, data on I/O lines can be received in synchronism with a clock CLK. A data rate for data received on I/O can take any suitable form, including single data rate (one bit cycle), double data rate (two bits per cycle), quad data rate (two bits per cycle on two I/O lines), or octal data rate (two bits per cycle on four I/O lines).

Figure 9A:
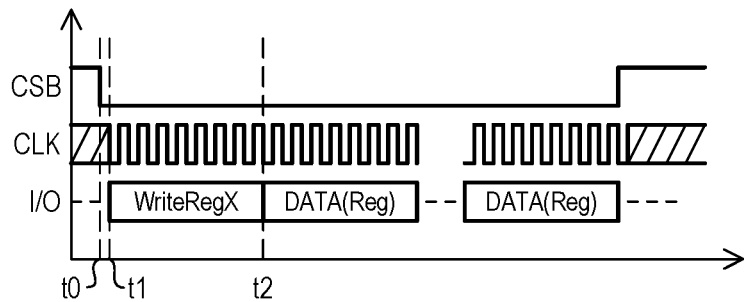
FIGS. 9A to 9D show inputs to a memory device for updating firmware according to embodiments.

FIG. 9A shows a register write instruction. At time t0, a chip select signal can go active. At time t1, memory device can receive an instruction "WriteRegX". This can be followed by configuration data (DATA(Reg)) at time t2. In response to such an instruction, a memory device can write DATA(Reg) into one or more registers indicated by the instruction WriteRegX. Writing data into such registers can control, provide data for, or initiate firmware update operations as described herein, or equivalents.

Figure 9B:
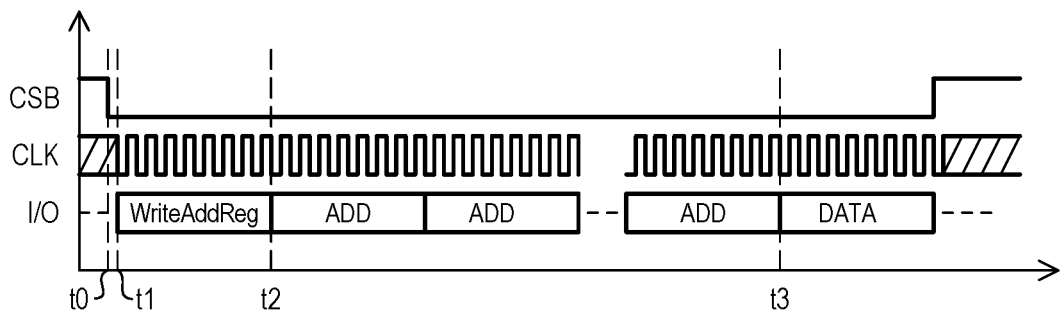

FIG. 9B shows an addressable register write instruction. At time t0, a chip select signal can go active. At time t1, memory device can receive an instruction "WriteAddReg". This can be followed by address data (ADD) at time t2, and then configuration data DATA at time t3. In response to such an instruction, a memory device can write DATA into the register indicated by the address data (ADD). Writing data to such a register can control, provide data for, or initiate firmware update operations as described herein, or equivalents.

Figure 9C:
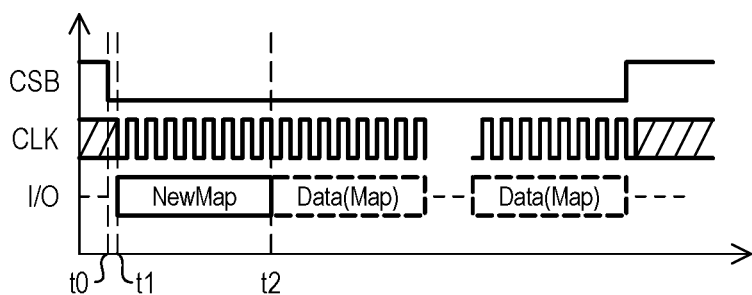

FIG. 9C shows a mapping instruction according to an embodiment. At time t0, a chip select signal can go active. At time t1, a memory device can receive an instruction "NewMap". This can be followed by data (DATA(Map)) at time t2. In response to such an instruction, mapping data (e.g., LA->PA mapping) for a new image can be stored in a remap history data structure, as described herein, or equivalents. Values DATA(Map) can include the mapping data.

Figure 9D:
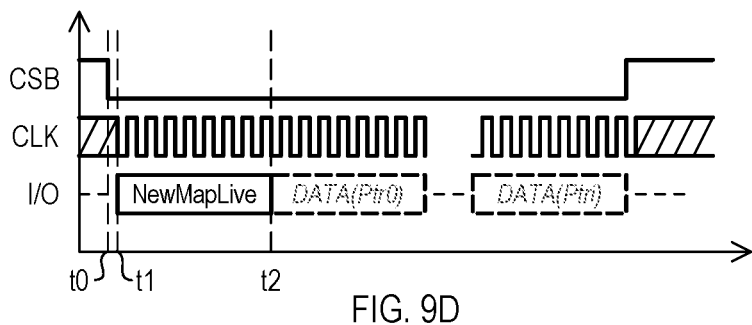

FIG. 9D shows an instruction to make a new firmware image live according to an embodiment. At time t0, a chip select signal can go active. At time t1, a memory device can receive an instruction "NewMapLive". Optionally, this can be followed by data (DATA(Ptr)). In response to such an instruction, a newest set of mapping data can be indicated as the firmware image that is to be provided going forward. In some embodiments, no data is needed, as a memory device control logic can update the value for the new mapping set. However, in other embodiments, DATA(Ptr) can be used to program a remap data structure (e.g., pointer values). Such an instruction can swap between firmware images in an atomic, immediate fashion.

Figure 10:
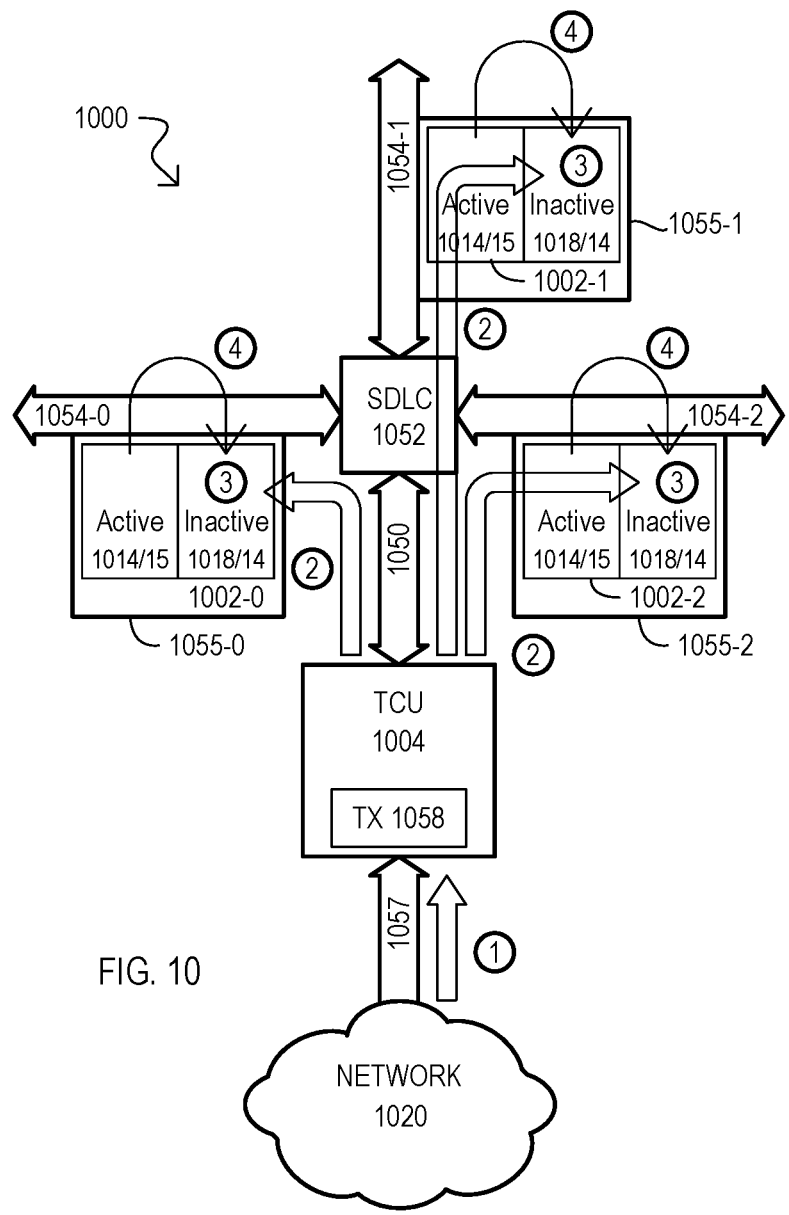
FIG. 10 shows a system that can include firmware-over-the-air (FOTA) updating according to an embodiment.

While embodiments can include systems, devices and methods that involve the update of firmware for a device or module, embodiments can also include systems having multiple devices/modules that can each require their own firmware update. FIG. 10 is a block diagram of one such system 1000.

A system 1000 can include a telematics control unit (TCU) (e.g. controller) 1004, a controller bus 1050, a systems development life cycle section 1052, module buses 1054-0 to -2, and modules 1055-0 to -1. Each of modules (1055-0 to -1) operates with firmware stored in a memory device 1002-0 to -2. A TCU 1004 can include a processor which can issue instructions to memory devices (1002-0 to -2). TCU 1004 can also include a wireless transceiver (or receiver) 1058 for receiving firmware updates via a wireless network. In particular embodiments, a system 1000 can be an automobile control system, and TCU 1004 may further include a global positioning system (GPS), one or more processors, and a controller memory.

While FIG. 10 shows separate module buses 1054-0 to -2, in other embodiments, more than one module can be connected to a same bus. Further, in other embodiments, a controller bus 1050 can be the same as a module bus (1054-0 to -2). Having described various components of system 1000, FOTA operations for the system 1000 will now be described.

Initially, memory devices 1002-0 to -2 can each store a current firmware image 1014/1015 (that is to be updated).

At ①, TCU 1004 can receive new firmware at wireless transceiver 1058 that is transmitted over a wireless connection 1057 of network 1020. A network 1020 can be any suitable network, and in some embodiments can be the Internet and/or a cellular network. In the example shown, new firmware can be received for all modules 1055-0 to -2. However, it is understood that in other update operations fewer numbers of modules may be updated. However, in other embodiments, new firmware can be received via a wired connection.

At ②, TCU 1004 can transmit the new firmware images to the respective memory devices 1055-0 to -2. Such an action can include TCU 1004 sending new firmware image over controller bus 1050 and module buses 1054-0. In one embodiment, such an action can include transmitting data over a controller area network (CAN) type bus.

At ③, modules 1055-0 to -2 can program a new firmware image 1018/14 into locations of the corresponding memory device 1002-0 to -2. Such an action can include any of those described herein, or equivalents. In one particular embodiment, new firmware image 1018/14 can be programmed into a "secondary" memory page of the memory device (the primary memory page storing the current firmware 1014/15). In some embodiments, the programming of the new firmware image can be accomplished with a processor (not shown) local to the module 1055-0 to -2. However, in other embodiments, such programming can be performed by TCU 1004.

At ④, the new firmware images 1018/1014 can be made "live" (and the other firmware images 1014/1015 designated as inactive). Such an action can be in response to inputs received from a TCU 1004. Such inputs can include, but are not limited to, instructions or register writes as described herein, or equivalents, as well as out-of-band signaling or actions by a processor local to modules 1055-0 to -2, or any other suitable signaling method.

Figure 11:
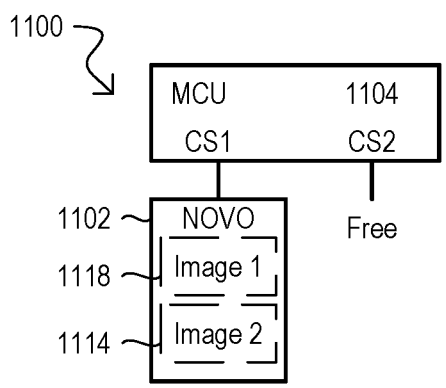
FIG. 11 is a block diagram of a system according to an embodiment.
Figure 16A:
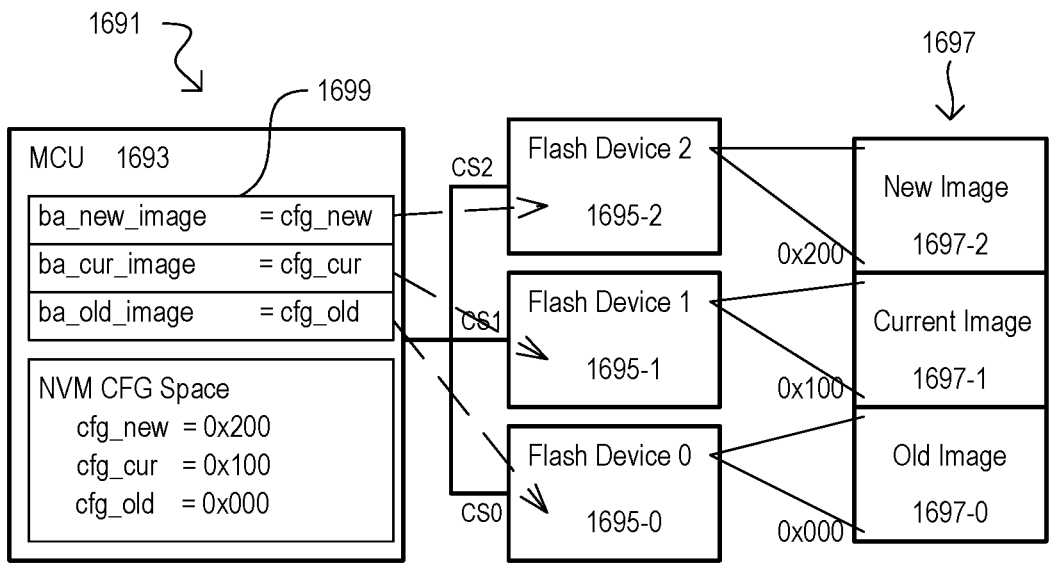
FIGS. 16A and 16B are diagrams showing a conventional system that provides FOTA updating.
Figure 16B:
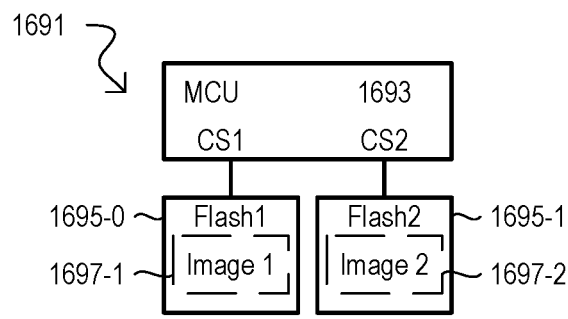

FIG. 11 is a block diagram of a system 1100 according to another embodiment. A system 1100 can include a controller (MCU) 1104 and a memory device 1002. Memory device 1002 can enable switching between at least two different firmware images (1114, 1118). As shown, controller 1104 can provide two chip select outputs (CS1, CS2) as in the conventional system shown in FIG. 16B. However, because memory device 1002 can manage switching between firmware images with a single memory device 1002 and single chip select (CS1), controller 1104 can have an extra chip select output CS2 available for other applications.

Figure 12A:
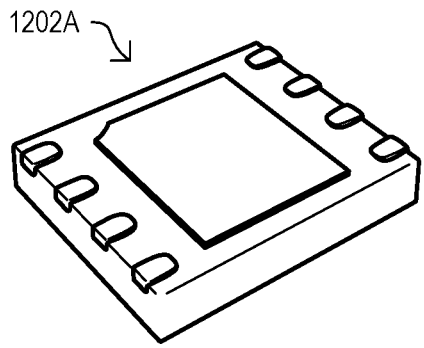
FIGS. 12A and 12B are perspective views of memory devices according to embodiments.
Figure 12B:
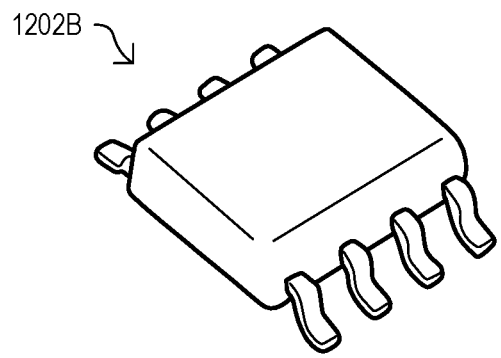

While embodiments can include systems with memory devices operating in conjunction with one or more controller devices, embodiments can also include standalone memory devices capable of enabling internal switching between different firmware images as described herein, and equivalents. While such memory devices can include multiple integrated circuits formed in a same package, in some embodiments memory devices can be advantageously compact single integrated circuits (i.e., chips). FIGS. 12A and 12B show two packaged single chip memory devices 1202A and 1202B. However, it is understood that memory devices according to embodiments can include any other suitable packaging type, including direct bonding of a memory device chip onto a circuit board substrate.

Figure 13A:
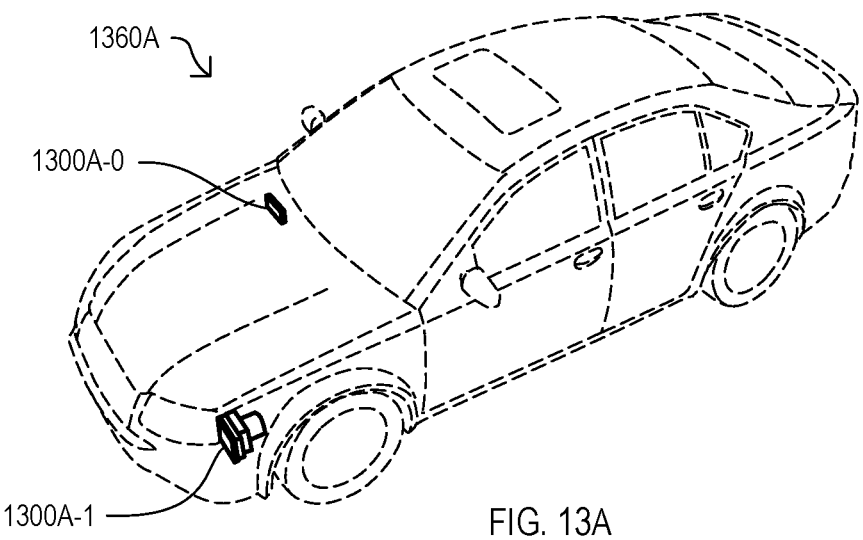
FIGS. 13A to 13C are diagrams of exemplary devices according to embodiments.
Figure 13B:
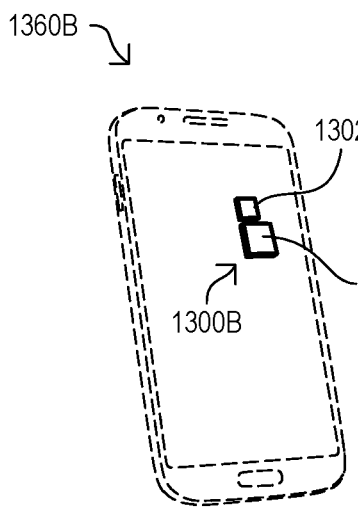
Figure 13C:
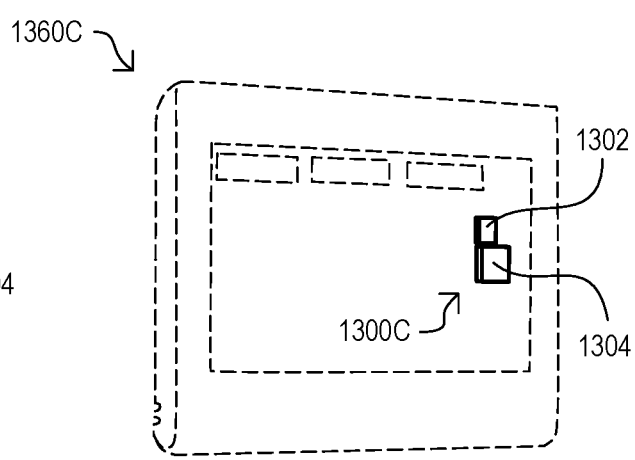

Referring to FIGS. 13A to 13C, various devices according to embodiments are shown in series of diagrams. FIG. 13A shows an automobile 1360A that can have numerous sub-systems (two shown as 1300A-0 and 1300A-1) that operate with updatable firmware. Such sub-systems (1300A-0, 1300A1) can include an electronic control unit (ECU) and/or an advanced driver assistance system (ADAS). However, in other embodiments such sub-systems can include a dashboard display/control sub-system and/or an infotainment sub-system, as but two of numerous possible examples. Each subsystem (1300A-0, 1300A1) can include a controller and memory device and employ firmware operations as described herein, or equivalents, including FOTA type updates.

FIG. 13B shows a handheld computing device 1360B. Handheld computing device 1360B can include a system 1300B, having a memory device 1302 and controller 1304 (not shown to scale) for performing firmware updates for the device 1360B as described herein, or equivalents.

FIG. 13C shows a controller device 1360C. Controller device 1360C can be a device deployed to control industrial or residential operations. As but a few of many possible examples, controller device 1360C can control machinery on a manufacturing line, be an electronic lock for a building, control a consumer appliance, control a lighting system, or control an irrigation system. Device 1360C can include a system 1300C, having a memory device 1302 and controller 1304 (not shown to scale) for performing firmware updates for the device 1360C as described herein, or equivalents.

Figure 14:
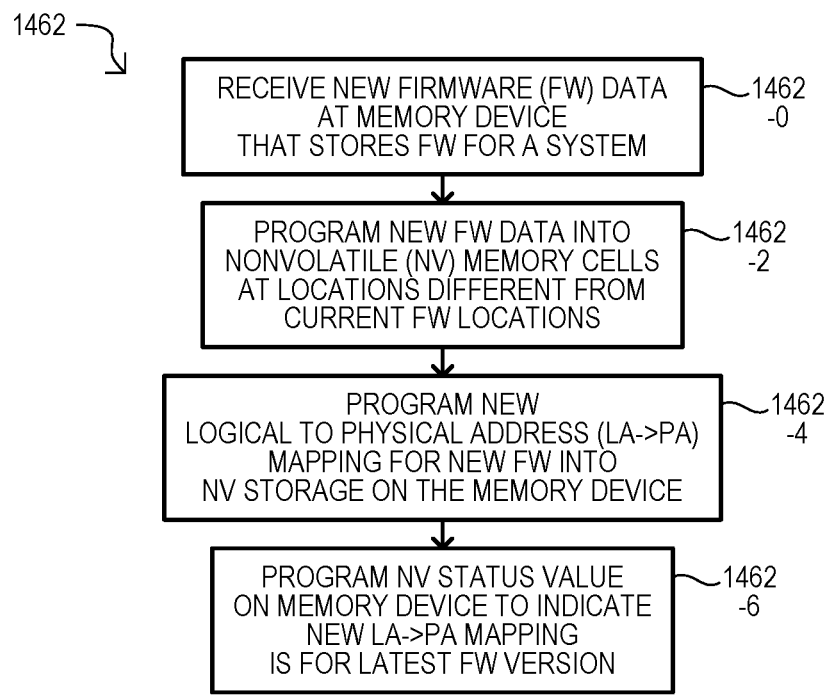
FIG. 14 is a flow diagram of a method according to an embodiment.

Referring now to FIG. 14, a method 1462 according to an embodiment is shown in a flow diagram. A method 1462 can include receiving new firmware data at a memory device that stores firmware for a system 1462-0. Such an action can include a memory device receiving program or write instructions for the firmware data via an interface on the memory device. In particular embodiments, such an action can include a memory device receiving instructions from a controller to program the firmware data at predetermined physical addresses.

Received firmware data can be programmed into nonvolatile memory cells at locations different from those that store current firmware 1462-2. In particular embodiments, such an action can include a memory device programming firmware data into one or more sectors of a flash memory array having an address range designated for the new firmware, and different from address ranges which stores current firmware.

It is noted that such an operation does not include the copying of firmware data from one location in the memory cell array of memory device to another location of the memory cell array in the same memory device.

A method 1462 can also include programming a new LA->PA mapping for the new firmware into nonvolatile storage on the memory device 1462-4. In some embodiments, such an action can include programming such data into a remap history data structure which retains such mappings for previous firmware versions.

A method 1462 can also include programming a nonvolatile status value on the memory device to indicate the new LA->PA mapping is for the latest firmware version 1462-6. In some embodiments, such an action can include programming values of a pointer data structure which points to an entry in a remap history data structure.

Figure 15A:
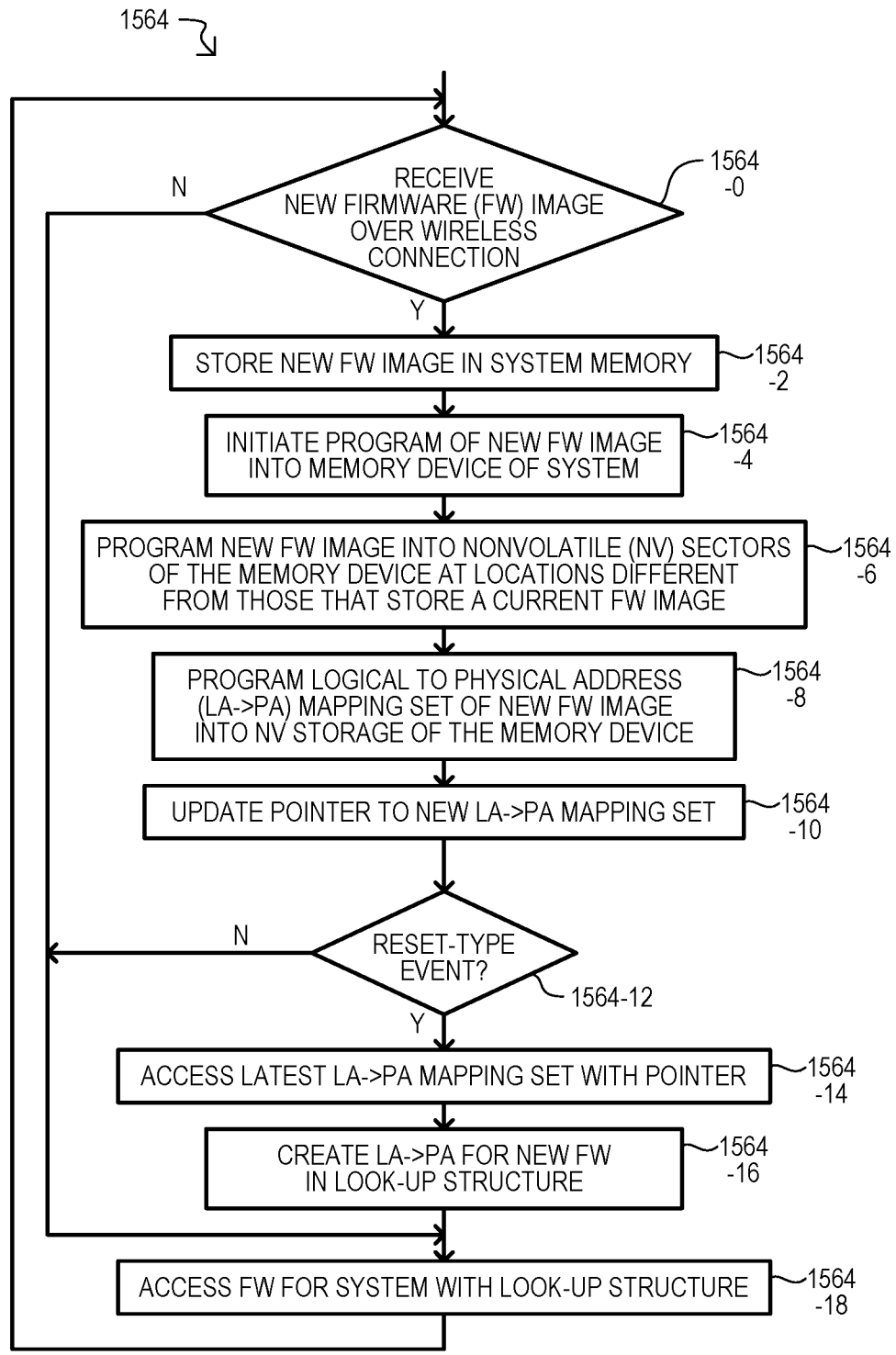
FIG. 15A is a flow diagram of a method according to another embodiment.

FIG. 15A shows a method 1564 according to another embodiment in a flow diagram. A method 1564 can be a FOTA method and can include determining when data for a new firmware image is received over a wireless connection 1564-0. Such an action can include a controller detecting when a wireless receiver of the system receives a firmware update.

If no new firmware image data is received (N from 1564-0), a method 1564 can access firmware as needed from a look-up structure 1564-18. In some embodiments, such an action can include a memory device receiving read requests to logical addresses of the firmware, and such logical addresses being translated into physical addresses with data from the look-up structure. In particular embodiments, the look-up structure can reside in volatile memory. It is understood that at this time, the system look-up structure corresponds to a current firmware image (which is to be superseded by any newly received firmware image).

If new firmware image data is received (Y from 1564-0), the new firmware image data can be stored in system memory 1564-2. In some embodiments, such an action can include storing the new firmware image data in a volatile system memory, such as a DRAM or SRAM, accessed by a controller, or the like.

A program operation of a memory device in the system can be initiated 1564-4. Such an action can include determining which particular memory device is to store the new firmware image. In some embodiments, such an action can include a controller issuing an instruction or the like to the memory device. The new firmware image can be programmed into nonvolatile sectors of the memory device at locations different from those that store a current firmware image 1564-6. Such an action can include a controller programming the firmware image stored in system memory into nonvolatile storage locations of the memory device.

An LA->PA mapping for the new firmware image can programmed into nonvolatile storage of the memory device 1564-8. Such an action can include any of those describe herein or equivalents, including programming such data into a remap history data structure which can retain mappings of previous firmware images in the same memory device.

A pointer to the new LA->PA mapping can be programmed 1564-10. Such an action can include any of those describe herein or equivalents, including setting a bit in a multi-bit value that corresponds to an entry in a remap history data structure. Such a pointer can be stored in a nonvolatile store of the memory device.

A method 1564 can determine if a reset-type event has occurred 1564-12. A reset-type event can be an event that causes memory device to reset logical address mapping from the current firmware image to the newly programmed (and "live") firmware image. A reset-type event can take any suitable form, including but not limited to, a POR event, the memory device receiving a particular instruction or register write, or a signal at a special input pin, to name only a few.

If a reset-type event is determined to not have occurred (N from 1564-12), a method 1564 can continue to access firmware with the look-up structure 1564-18, which can continue to be the firmware image to be superseded by the newly received firmware image.

Figure 15B:
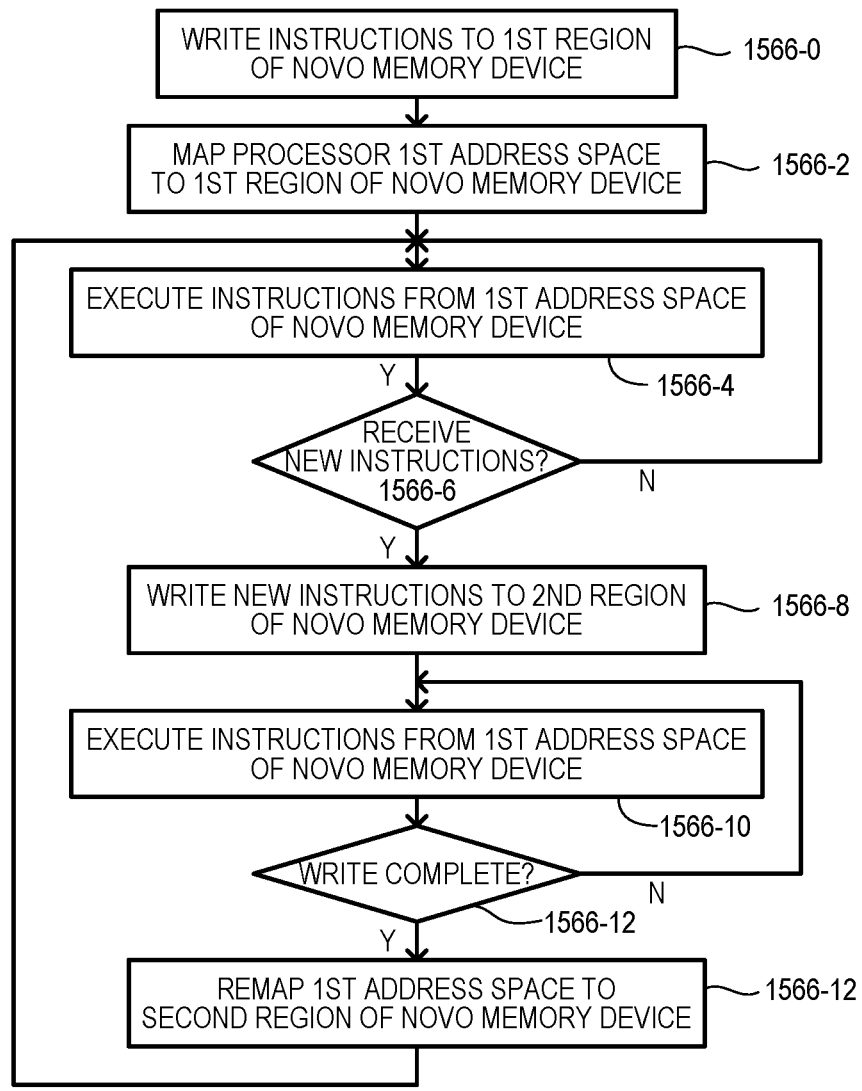
FIG. 15B is a flow diagram of a method of updating instructions stored by a nonvolatile memory device according to another embodiment.

If a reset-type event is determined to have occurred (Y from 1564-12), a memory device can access the latest LA->PA mapping set with the pointer 1564-14 (which corresponds to the newly received firmware image). A memory device can then create a new LA->PA look-up structure corresponding to the new firmware image 1564-16. As a result, firmware accesses of 1564-18 will now be to the new firmware image. FIG. 15B is a flow diagram of a method 1566 according to another embodiment.

A method 1566 can include writing first instructions to a first region of a nonvolatile memory device 1566-0. In some embodiments, such an action can include writing all or a portion of a firmware image to first regions of the NVM device. A first processor address space can be mapped to a first region of the NVM device 1566-2. A method 1566 can include executing instructions from the first address space of the NVM device 1566-4. A method 1566 can determine if new instructions are received 1566-6. If new instructions are not received (N from 1566-6), a method 1566 can continue to execute instructions from the first address space.

If new instructions are received (Y from 1566-6), a method 1566 can write new instructions into a second region of the NVM device 1566-8. While new instructions are written to a second region (N from 1566-12), a method 1566 can continue to execute instructions from the first address space 1566-10.

Once a write operation to the second region is complete (Y from 1566-12), a method 1566 can remap a first address space to the second region of the NVM device 1566-12. A method 1566 can then return to executing instructions from the first address space (return to 1566-4).

Figure 15C:
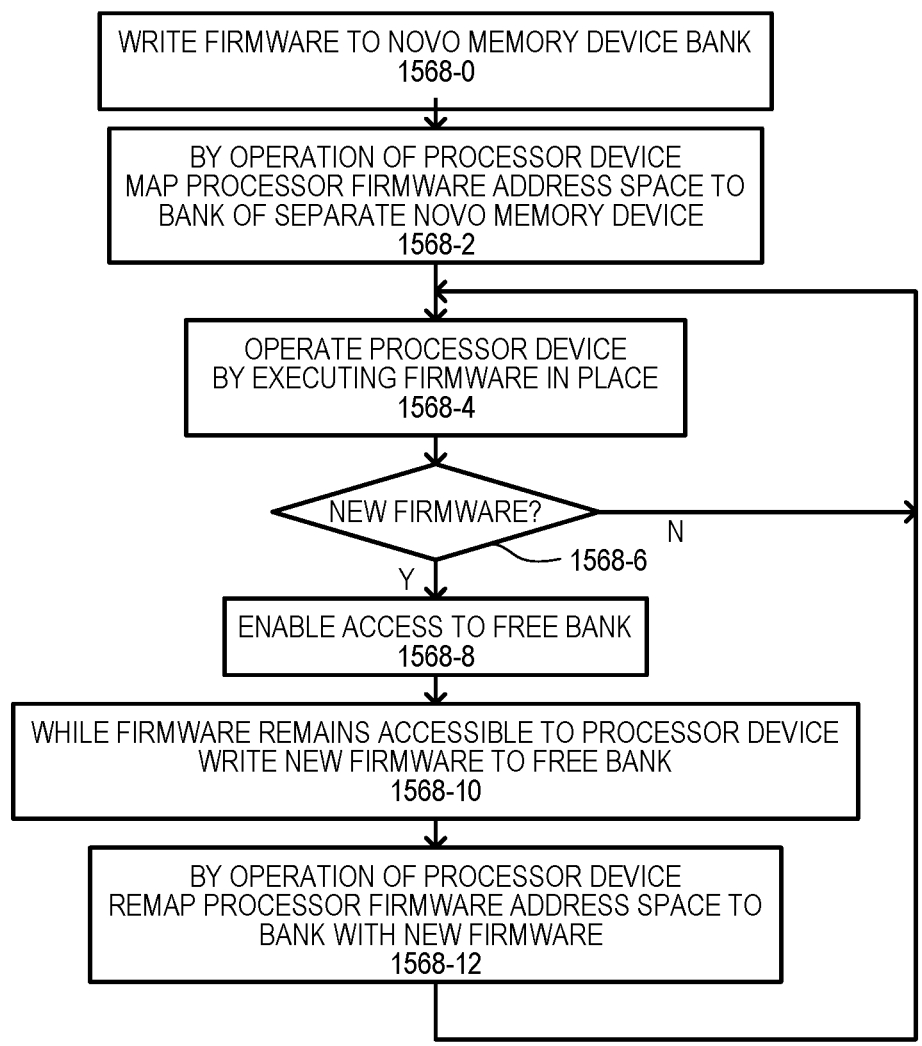
FIG. 15C is a flow diagram of controller operations according to an embodiment.

FIG. 15C is a flow diagram of a method 1568 for a controller device to update a firmware of a system. A method 1568 can include writing firmware to a bank of a NVM device 1568-0. By operation of a processor device, a processor address space can be mapped to the bank of the NVM device 1568-2. Such an action can include a memory device configuring remap circuits in a memory device as described herein, or an equivalent. A method 1568 can include a processor device executing the firmware in place 1568-4. Such an action can include a processor device accessing the firmware via remap circuits. A method 1568 can determine if new firmware is received 1568-2. If new firmware is not received (N from 1568-6), a method 1568 can continue to operate by executing the firmware in place.

If new firmware is received (Y from 1568-6), a method 1568 can enable access to a new bank 1568-8. In some embodiments, such an action can include any access methods as described herein, or equivalents. While the firmware remains accessible to the processor device, a method 1568 can write the new firmware to the free bank 1568-10. By operation of the processor device, the processor firmware can be remapped to the bank with the new firmware 1568-12.

Embodiments as described herein, can include an application programming interface (API) that can be called to execute a firmware image update as described herein, or equivalents. A new firmware image can be loaded into some arbitrary address range (addr_new_img) in a memory device which stores a current firmware image in another address range (addr_cur_img). An API can use such address information to execute a firmware update. For example, an API can have the form of "fota_switch (addr_cur_img, addr_new_img)".

Such an arrangement can enable firmware to be "relocated" within an address space of a memory device (i.e., switch from accessing the old firmware to accessing the new firmware) without having to copy firmware data from one location to another in the memory device (e.g., the firmware data is written/programmed once). The relocation operation can be atomic (i.e., a single bus transaction) and essentially instantaneous. For example, as noted herein, an instruction or register write to the memory device can put the remapping to the new firmware in place.

Embodiments of the invention can advantageously reduce or eliminate the use of multiple flash memory devices to store different firmware images, as different firmware images can be stored in one memory device, capable of making an immediate switch to a new image once it is stored. This can reduce the cost of systems, as fewer memory devices are needed. In addition, systems that would normally include multiple flash device with different firmware images on a same bus, can achieve a same result with only one device (or a fewer number of devices) on the bus. This can reduce bus capacitance, increasing performance of a system (i.e., increasing bus speeds).

Embodiments of the invention can allow for a system to provide instantaneous switching between firmware images with one memory device connected to one chip select output. This can reduce costs, as controller devices with fewer chip select outputs can be used. In addition or alternatively, there can be greater freedom in system design, as one or more chip select outputs will now be free for other uses (i.e., uses other than accessing a firmware image).

These and other advantages would be understood by those skilled in the art.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
storing first boot instruction data in a first region of a nonvolatile memory device;
by operation of remap circuits in the nonvolatile memory device, mapping addresses of the first region to predetermined memory address spaces of a processor device, the predetermined memory address spaces being accessed in a boot operation of the processor device;
executing the first boot instruction data from the first region with the processor device in the boot operation;
receiving second boot instruction data for the processor device; while the first boot instruction data remains available to the processor device, writing the second boot instruction data into a second region of the nonvolatile memory device;
by operation of the processor device sending data to the nonvolatile memory device, reconfiguring the remap circuits to remapping addresses of the second region to the predetermined memory address spaces of the processor device; and
executing the second boot instruction data from the second region with the processor device in a subsequent boot operation.

2. The method of claim 1, wherein:
prior to remapping addresses of the second region, the first region occupies a first range of addresses;
the second region occupies a second range of addresses.

3. The method of claim 1, wherein:
prior to remapping addresses of the second region, the second region is not accessible for read operations.

4. The method of claim 1, wherein:
the first region and second region of the nonvolatile memory device are different banks of the nonvolatile memory device; wherein accesses to one bank can overlap in time with accesses to other banks.

5. The method of claim 1, further including:
remapping addresses of the second region to the predetermined memory address spaces of the processor device includes receiving and storing remapping data in at least one configuration register of the nonvolatile memory device.

6. The method of claim 1, wherein:
the processor device has a memory address space with a predetermined range; and
the second region has an address outside of the predetermined range.

7. The method of claim 1, wherein:
receiving the second boot instruction data includes receiving the second boot instruction data from a source remote from the nonvolatile memory device and processor device.

8. A memory device, comprising:
at least one memory cell array formed in a substrate arranged into a plurality of separate regions, each region including a plurality of nonvolatile memory cells;
mapping circuits formed in the substrate and configured to map addresses of each region to any one of a plurality of processor address spaces in response to remap data received from a processor device, the processor address spaces including a boot address space from which the processor device accesses in a boot operation;

a configuration store formed in the substrate and coupled to the mapping circuits and configured to store the remap data; and control circuits formed in the substrate and configured to enable access by the processor device to one region mapped to the boot address space storing one version of processor boot instructions, while writing another version of the processor boot instructions to another region.

9. The memory device of claim 8, wherein:

the configuration store includes at least one configuration register accessible via a register write operation to the memory device.

10. The memory device of claim 8, wherein:

the control circuits include an instruction decoder configured to enable access to the configuration store in response to a received instruction.

11. The memory device of claim 8, wherein:

different remap data change an address decoding of the most significant bits of memory addresses used to access the regions.

12. The memory device of claim 8, wherein: the regions are different banks of the memory device; wherein accesses to one bank can overlap in time with accesses to other banks.

13. The memory device of claim 8, wherein:

the mapping circuits are configured to map addresses of each region to a different address space of a processor device.

14. A system, comprising:

a nonvolatile memory (NVM) device including nonvolatile memory cells arranged into a plurality of regions configured to store at least instruction data, and mapping circuits configured to assign any of a plurality of different processor memory address ranges to each region in response to remap data;

a processor device is coupled to the NVM device by at least one bus, the processor device configured to execute boot instruction data in a boot operation by accessing a predetermined processor memory address range that is mapped to a first region of the NVM device by the mapping circuits of the NVM device, and transmit remap data to the NVM device to reconfigure the mapping circuits of the NVM device to remap the predetermined processor memory address range to a second region of the NVM device that stores updated boot instruction data for execution by the processor device.

15. The system of claim 14, wherein:

the regions are different banks of the NVM device; wherein accesses to one bank can overlap in time with accesses to other banks.

16. The system of claim 14, wherein:

the reconfigured mapping circuits are configured to change an address decoding of the most significant bits of memory addresses used to access the regions in response to the remap data.

17. The system of claim 14, wherein:

the NVM device and processor device are separated integrated circuits.

18. The system of claim 17, wherein:

memory arrays of the processor device consist of volatile memory circuits.

19. The system of claim 14, wherein:

the NVM device is coupled to the processor device by a serial data bus having at least one serial data line on which address and data values are transmitted and received.

20. The system of claim 16, further including a wireless transceiver configured to receive the updated boot instruction data from a source remote from the nonvolatile memory device and processor device.

* * * * *